US010591847B2

(12) United States Patent
Yomoda et al.

(10) Patent No.: US 10,591,847 B2
(45) Date of Patent: Mar. 17, 2020

(54) DEVELOPER SUPPLY CONTAINER

(71) Applicant: CANON KABUSHIKI KAISHA, Tokyo (JP)

(72) Inventors: Nobuyuki Yomoda, Kashiwa (JP); Ayatomo Okino, Moriya (JP); Manabu Jimba, Toride (JP); Akihito Kamura, Kashiwa (JP); Takashi Enokuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/713,912

(22) Filed: Sep. 25, 2017

(65) Prior Publication Data

US 2018/0024465 A1 Jan. 25, 2018

Related U.S. Application Data

(60) Division of application No. 14/582,849, filed on Sep. 14, 2015, now Pat. No. 9,811,024, which is a
(Continued)

(30) Foreign Application Priority Data

Mar. 22, 2013 (JP) ................................ 2013-060344

(51) Int. Cl.
*G03B 15/08* (2006.01)
*G03G 15/08* (2006.01)
(52) U.S. Cl.
CPC ......... *G03G 15/0877* (2013.01); *G03G 15/08* (2013.01); *G03G 15/0872* (2013.01)
(58) Field of Classification Search
None
See application file for complete search history.

(56) References Cited

U.S. PATENT DOCUMENTS 5,235,354 A 8/1993 Larson
5,402,158 A 3/1995 Larson
(Continued)

FOREIGN PATENT DOCUMENTS

CN 102378941 A 3/2012
DE 11 2010 001 458 T5 6/2012
(Continued)

OTHER PUBLICATIONS

Written Opinion of the International Searching Authority and International Search Report in International Patent Application No. PCT/JP2013/060408.
(Continued)

*Primary Examiner* — William B Perkey
(74) *Attorney, Agent, or Firm* — Venable LLP

(57) ABSTRACT

A developer supply container 1 detachably mountable to a developer supplying apparatus 201 includes a developer accommodating portion 2 capable of accommodating a developer, a discharge opening 4a for discharging the developer accommodated in the developer accommodating portion 2 toward the developer supplying apparatus 201, a pump portion 3a for effecting a discharging operation through the discharge opening 4a, a communicating portion 4d provided at a position contacting the discharge opening 4a and capable of storing a constant amount of the developer, and a regulating portion 7 capable of taking a developer flow regulating state in which the flow of the developer into the communicating portion 4d and a developer flow non-regulating state in which the entering of the developer is not regulated, the regulating portion 7 taking the developer flow regulating state in a discharging operation of the pump portion 3a, wherein the regulating portion 7 is provided with an air flow path 7g for communicating between the communicating portion 4d and the pump portion 3a.

4 Claims, 28 Drawing Sheets

Related U.S. Application Data continuation of application No. PCT/JP2013/060408, filed on Mar. 29, 2013.

(56) References Cited

U.S. PATENT DOCUMENTS

| | | | |
|---|---|---|---|
| 5,446,478 | A | 8/1995 | Larson |
| 6,556,800 | B2 | 4/2003 | Matsuda et al. |
| 7,050,728 | B2 | 5/2006 | Minagawa et al. |
| 8,000,614 | B2 | 8/2011 | Okino et al. |
| 9,152,088 | B1 | 10/2015 | Kobori et al. |
| 9,811,024 | B2* | 11/2017 | Yomoda ............. G03G 15/0877 |
| 2003/0142999 | A1 | 7/2003 | Fujii et al. |
| 2006/0181726 | A1 | 8/2006 | Naito et al. |
| 2009/0169266 | A1 | 7/2009 | Uehara |
| 2011/0097094 | A1 | 4/2011 | Hamano et al. |
| 2012/0014713 | A1 | 1/2012 | Murakami et al. |
| 2012/0014722 | A1 | 1/2012 | Okino et al. |
| 2013/0209140 | A1 | 8/2013 | Murakami et al. |
| 2015/0055985 | A1 | 2/2015 | Suzuki |
| 2016/0070202 | A1* | 3/2016 | Murakami ......... G03G 15/0875 399/258 |
| 2016/0139536 | A1* | 5/2016 | Okino ............... G03G 15/0812 399/262 |
| 2018/0024465 | A1* | 1/2018 | Yomoda ............. G03G 15/0872 |

FOREIGN PATENT DOCUMENTS

| | | |
|---|---|---|
| EP | 2 416 222 A1 | 2/2012 |
| EP | 2 416 223 A1 | 2/2012 |
| EP | 2 977 821 A1 | 1/2016 |
| JP | H04-143781 A | 5/1992 |
| JP | H04-505899 A | 10/1992 |
| JP | H06-130812 A | 5/1994 |
| JP | H06-250520 A | 9/1994 |
| JP | 10-2007-0085096 A | 8/2007 |
| JP | 2009-128429 A | 6/2009 |
| JP | 2009-175703 A | 8/2009 |
| JP | 2010-256894 A | 11/2010 |
| JP | 2012-093735 A | 5/2012 |
| RU | 2 323 462 C2 | 4/2008 |
| WO | 2013/031996 A1 | 3/2013 |

OTHER PUBLICATIONS

Aug. 31, 2017 Notice of Allowance in Korean Patent Application No. 10-2015-7029263.
Official Communication in European Patent Application No. 13 878 542.3, dated Nov. 2, 2016.
Communication in European Patent Application No. 13 878 542.3, dated Jul. 30, 2018.
Examination Report in United Kingdom Patent Application No. GB1518681.0, dated Jun. 27, 2018.
Office Action in Russian Patent Application No. 2015145288, dated Jan. 24, 2018 (with English Translation).
Office Action in Japanese Patent Application No. 2017-228654, dated Aug. 7, 2018.
Decision to Grant in Russian Patent Application No. 2015145288, dated Sep. 28, 2018 (with English translation).
Office Action in Japanese Patent Application No. 2017-228654, dated Oct. 30, 2018.
Office Action in German Patent Application No. 11 2013 006 853.2, dated Nov. 13, 2018 (with partial English translation).
Dec. 20, 2018 Office Action in Chinese Patent Application No. 201380075849.9 (with English translation).
Office Action in Indian Patent Application No. 6343/CHENP/2015, dated Jan. 14, 2019.
Search Report in U.K. Patent Application No. GB1900261.7, dated Mar. 11, 2019.
Decision on Grant in Russian Patent Application No. 2018142909, dated May 27, 2019 (with English translation).
English translation of Apr. 10, 2019 Office Action in Korean Patent Application No. 10-2017-7034495.
Apr. 10, 2019 Office Action in Korean Patent Application No. 10-2017-7034495.
Office Action in Brazilian Patent Application No. BR 11 2015 022113-0, dated Dec. 10, 2019 (with English translation).
Office Action in Russian Patent Application No. 2019124474, dated Dec. 13, 2019 (with English translation).
Decision to Grant in Russian Patent Application No. 2019124474, dated Jan. 21, 2020 (with English translation).

* cited by examiner (a)

(b)

(c)

(a)

(b)

(a)

(b)

(c)

(a)

(b)

(a)

(b)

(a)

(b)

DEVELOPER SUPPLY CONTAINER

FIELD OF THE INVENTION

The present invention relates to a developer supply container detachably mountable to a developer replenishing apparatus. The developer supply container is used with an image forming apparatus such as a copying machine, a facsimile machine, a printer or a complex machine having functions of a plurality of such machines.

BACKGROUND ART

Conventionally, an image forming apparatus such as an electrophotographic copying machine uses a developer of fine particles. In such an image forming apparatus, the developer is supplied from the developer supply container in response to consumption thereof resulting from image forming operation.

Such a developer supply container is disclosed in Japanese Laid-open Patent Application 2010-256894, for example.

The apparatus disclosed in Japanese Laid-open Patent Application 2010-256894 employs a system in which the developer is discharged using a bellow pump provided in the developer supply container. More particularly, the bellow pump is expanded to provide a pressure lower than the ambient pressure in the developer supply container, so that the air is taken into the developer supply container to fluidize the developer. In addition, the bellow pump is contracted to provide a pressure higher than the ambient pressure in the developer supply container, so that the developer is pushed out by the pressure difference between the inside and the outside of the developer supply container, thus discharging the developer. By repeating the two steps alternately, the developer is stably discharged.

SUMMARY OF THE INVENTION

Problem to be Solved by the Invention

As described above, with the apparatus disclosed in Japanese Laid-open Patent Application 2010-256894, the developer can be stably discharged out of the developer supply container, but for the purpose of further image formation stability of the image forming apparatus, a higher supply accuracy is desired for the developer supply container.

Accordingly, it is an object of the present invention to provide a developer supply container with which the supply accuracy of the developer from the developer supply container to the image forming apparatus is higher.

Means for Solving the Problem

The present invention provides a developer supply container detachably mountable to a developer supplying apparatus, comprising a developer accommodating portion capable of accommodating a developer; a discharge opening for discharging the developer accommodated in said developer accommodating portion, from said developer supply container; a fluid communication path extending from a inside of said developer supply container to said discharge opening; a pump portion having a volume changing with reciprocation and actable at least on said discharge opening; a regulating portion for regulating flow of the developer into an entrance region of said penetration path formed in an inner surface of said developer supply container; a movable portion for effecting movement of said regulating portion to said entrance region and for effecting retraction of said regulating portion from the entrance region; and an air flow path, provided inside said regulating portion, for fluid communication between said discharge opening and at least said pump portion.

Effects of the Invention

According to the present invention, the developer can be discharged with high supply accuracy from the developer supply container, and therefore, a developer supply container having a more stabilized discharging property to the image forming apparatus can be provided.

Figure 2:
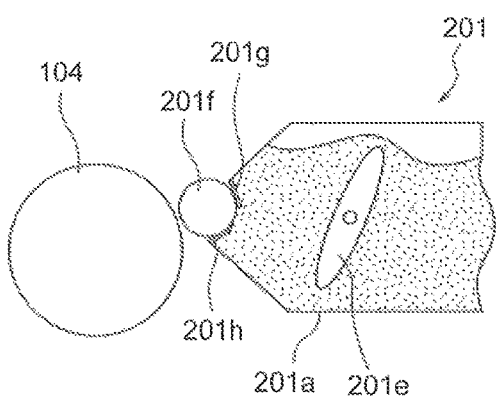
Figure 2:
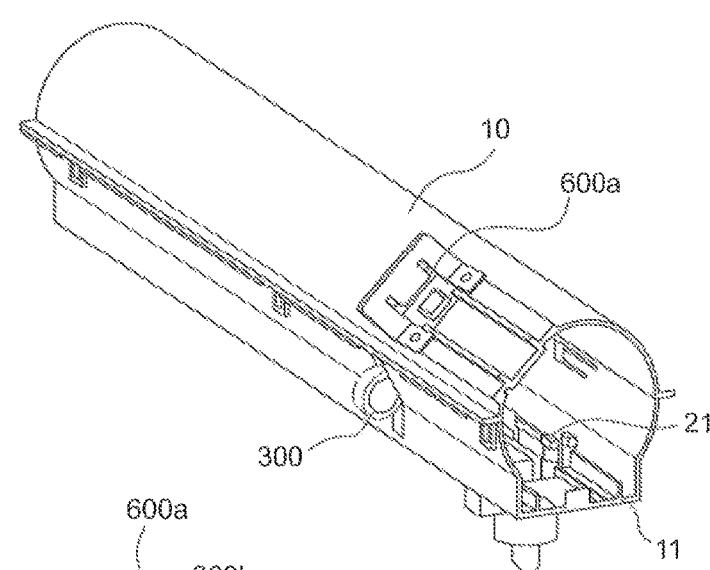
Figure 2:
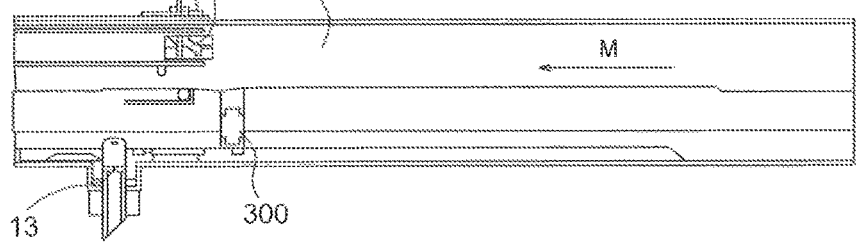

Part (a) of FIG. 2 is a partially sectional view of the developer supplying apparatus, (b) is a perspective view of a mounting portion, and (c) is a sectional view of the mounting portion.

Figure 3:
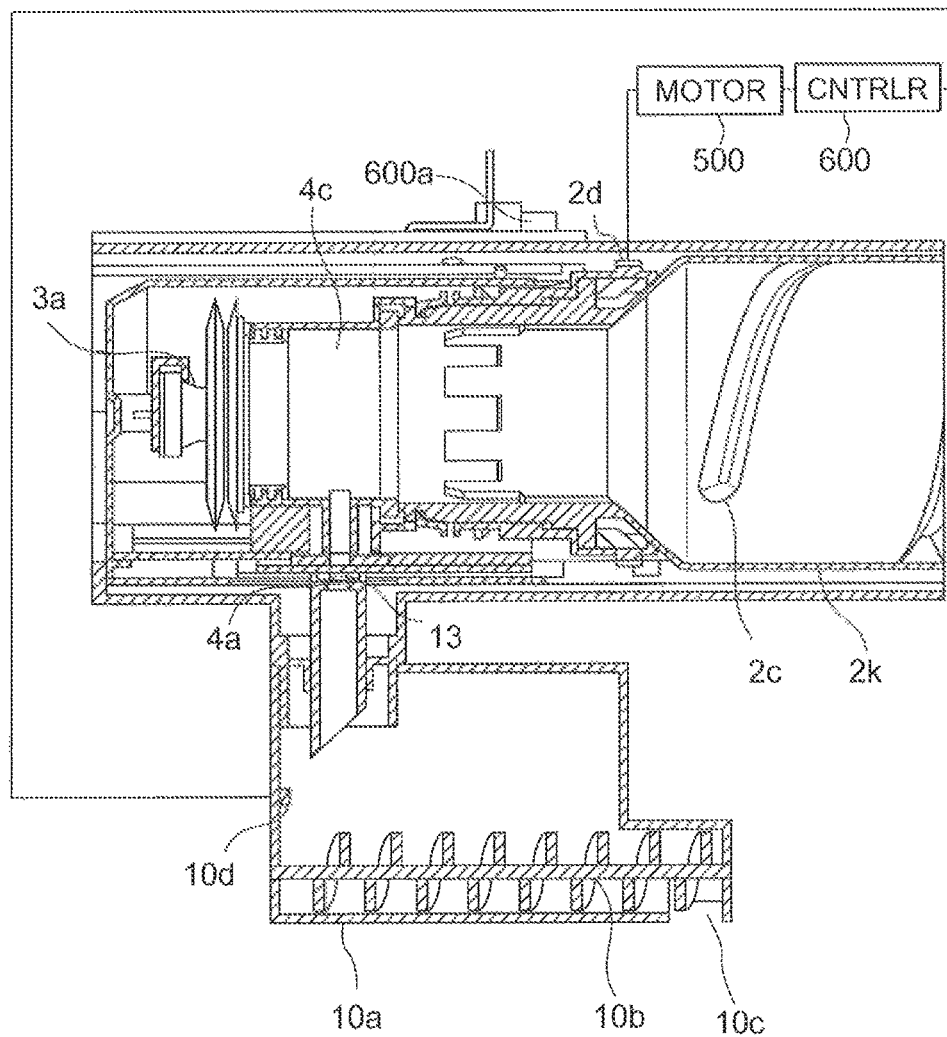

FIG. 3 is an enlarged sectional view illustrating a developer supply container and the developer replenishing apparatus.

Figure 4:
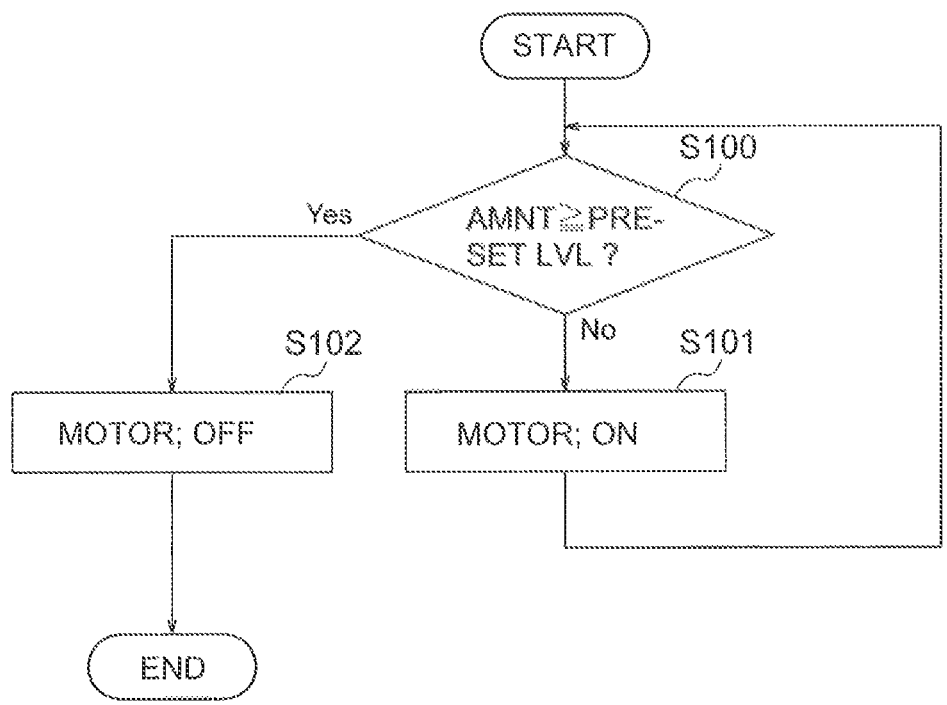

FIG. 4 is a flow chart illustrating a flow of a developer supply operation.

Figure 5:
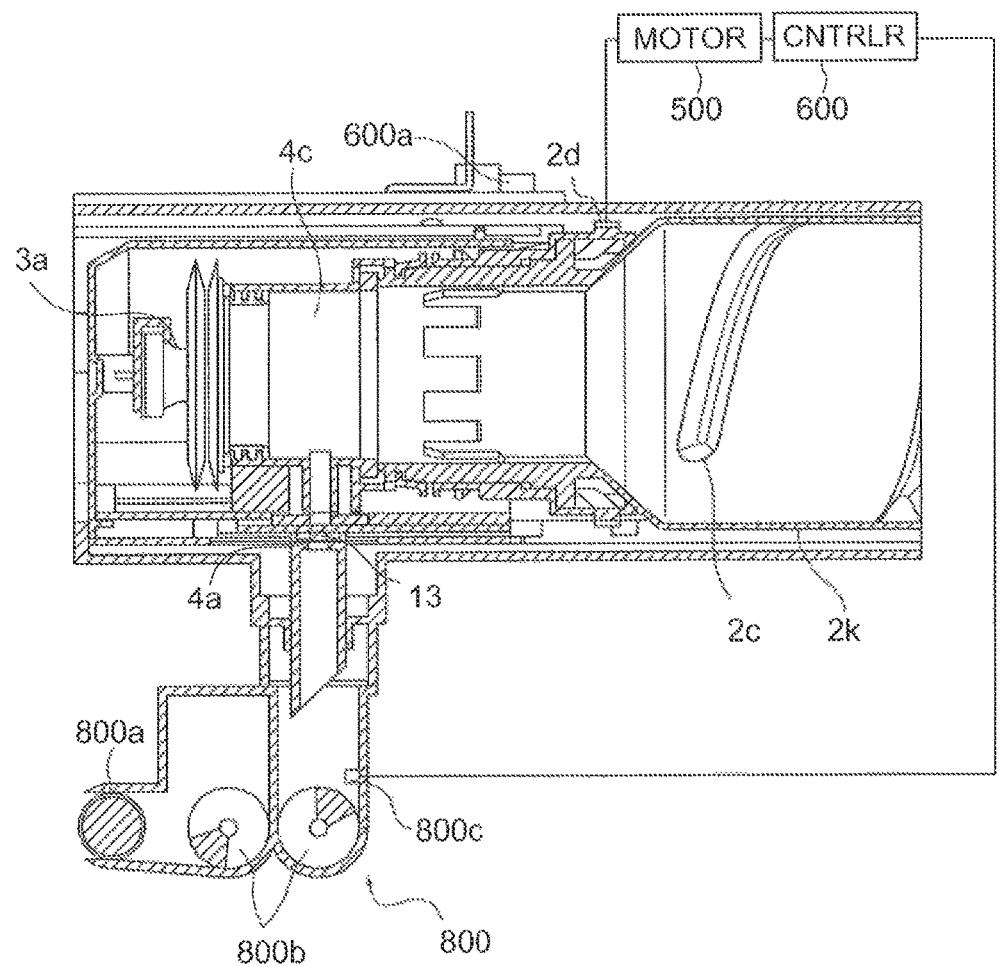

FIG. 5 is an enlarged sectional view of a modified example of the developer replenishing apparatus.

Figure 6:
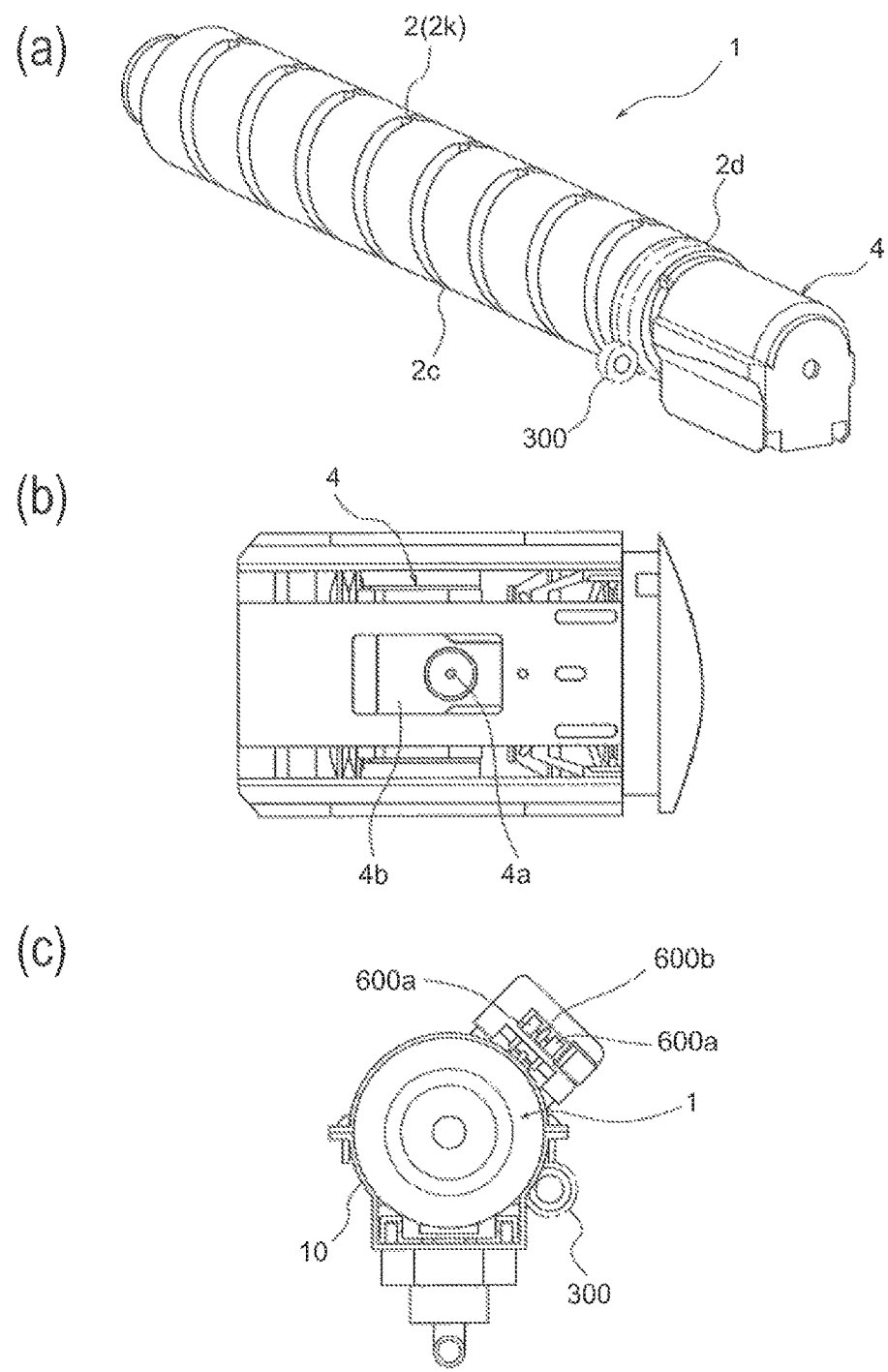

Part (a) of FIG. 6 is a perspective view illustrating the developer supply container according to Embodiment 1 of the present invention, (b) is a partial enlarged view illustrating a state around a discharge opening, and (c) is a front view illustrating a state in which the developer supply container is mounted to the mounting portion of the developer supplying apparatus.

Figure 7:
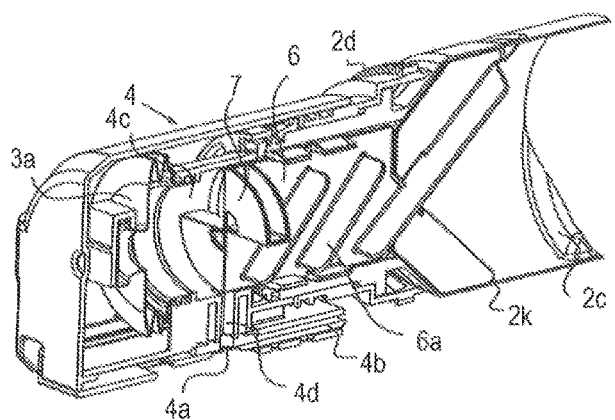
Figure 7:
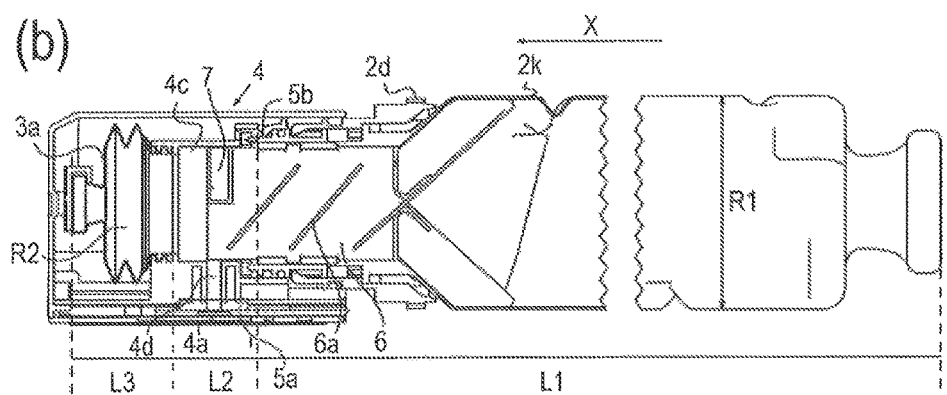
Figure 7:
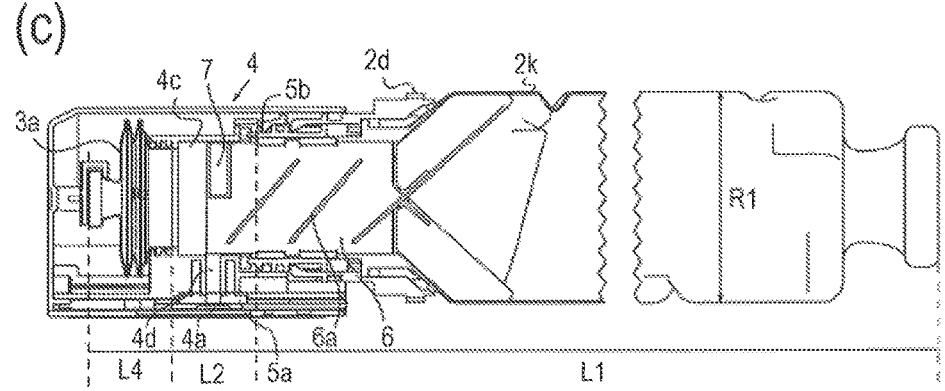

Part (a) of FIG. 7 is a sectional perspective view of the developer supply container, (b) is a partially sectional view in a state in which the pump portion is expanded to the maximum usable limit, and (c) is a partially sectional view in a state in which the pump portion is contracted to the maximum usable limit.

Figure 8:
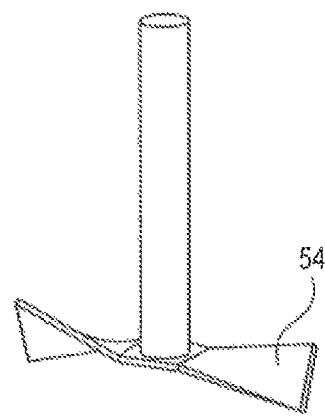
Figure 8:
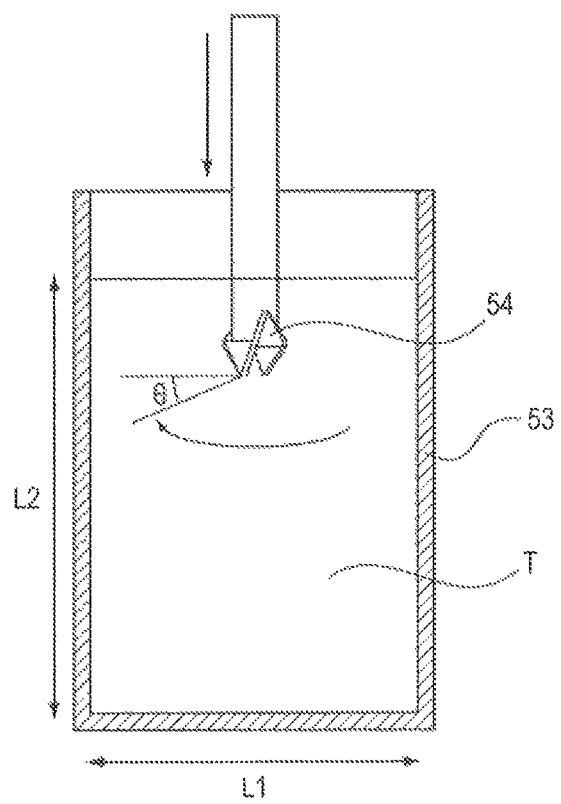

Part (a) of FIG. 8 is a perspective view of a blade used with a device for measuring fluidity energy, and (b) is a schematic view of the device.

Figure 9:
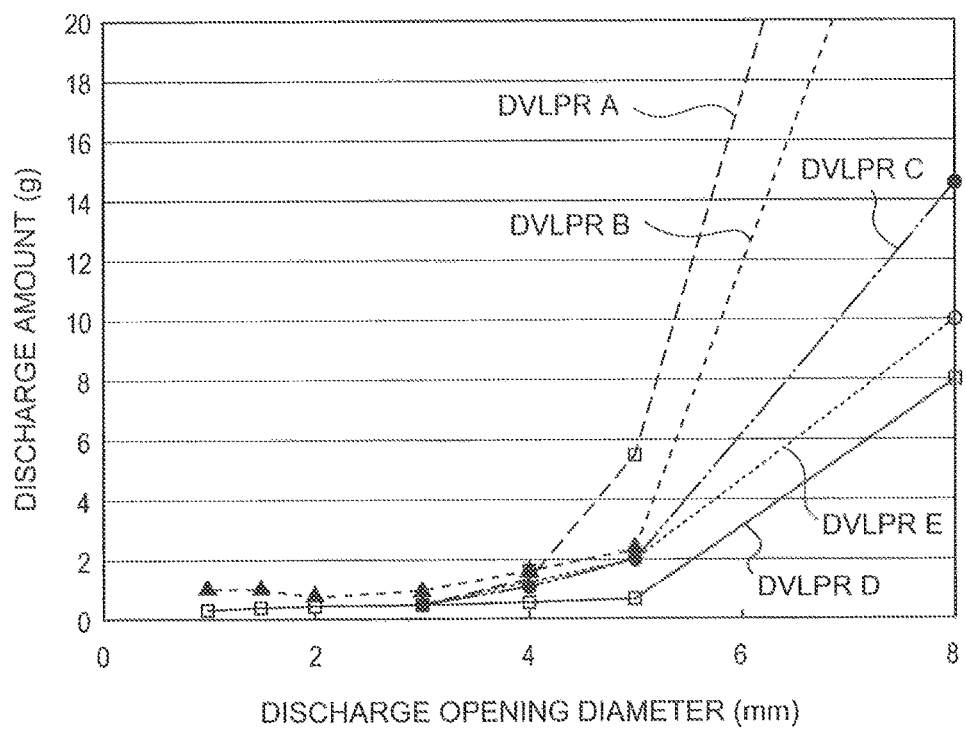

FIG. 9 is a graph showing a relation between a diameter of a discharge opening and a discharge amount.

Figure 10:
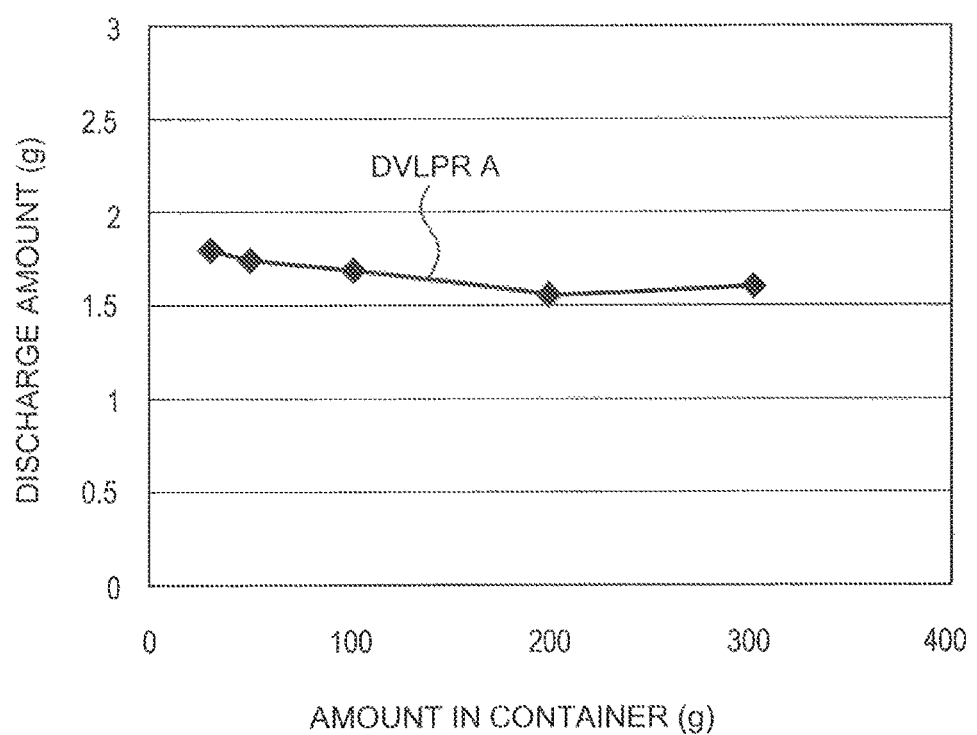

FIG. 10 is a graph showing a relation between an amount in the container and a discharge amount.

Figure 11:
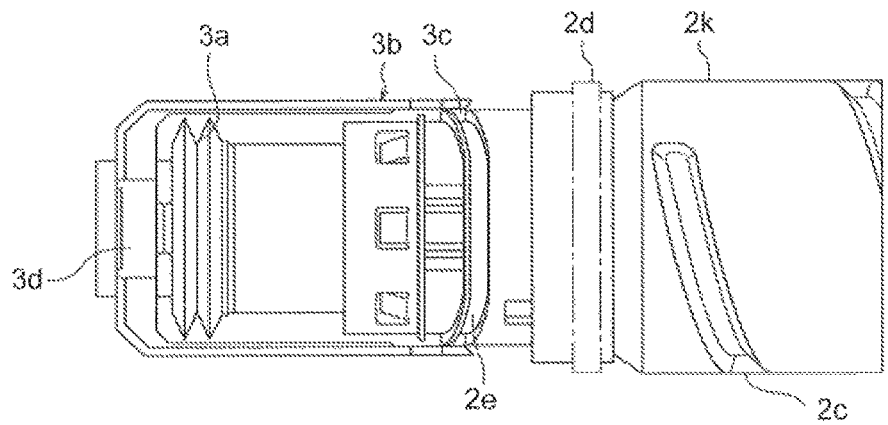
Figure 11:
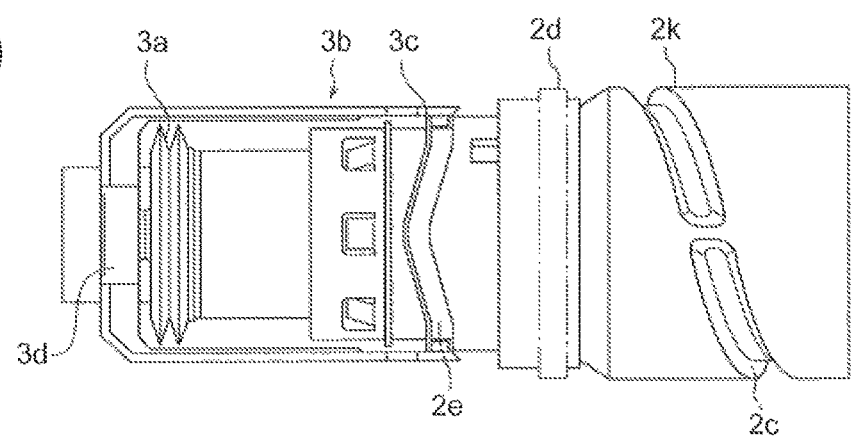
Figure 11:
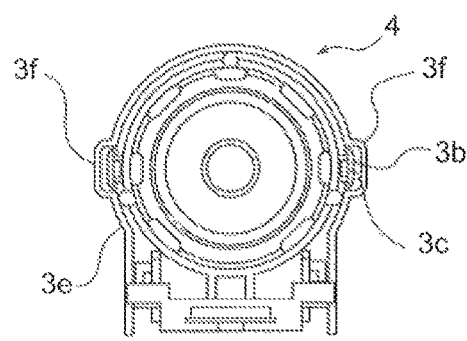

Part (a) of FIG. 11 is a partial view in a state in which the pump portion is expanded to the maximum usable limit, (b) is a partial view in a state in which the pump portion is contracted to the maximum usable limit, and (c) is a partial view of the pump portion.

Figure 12:
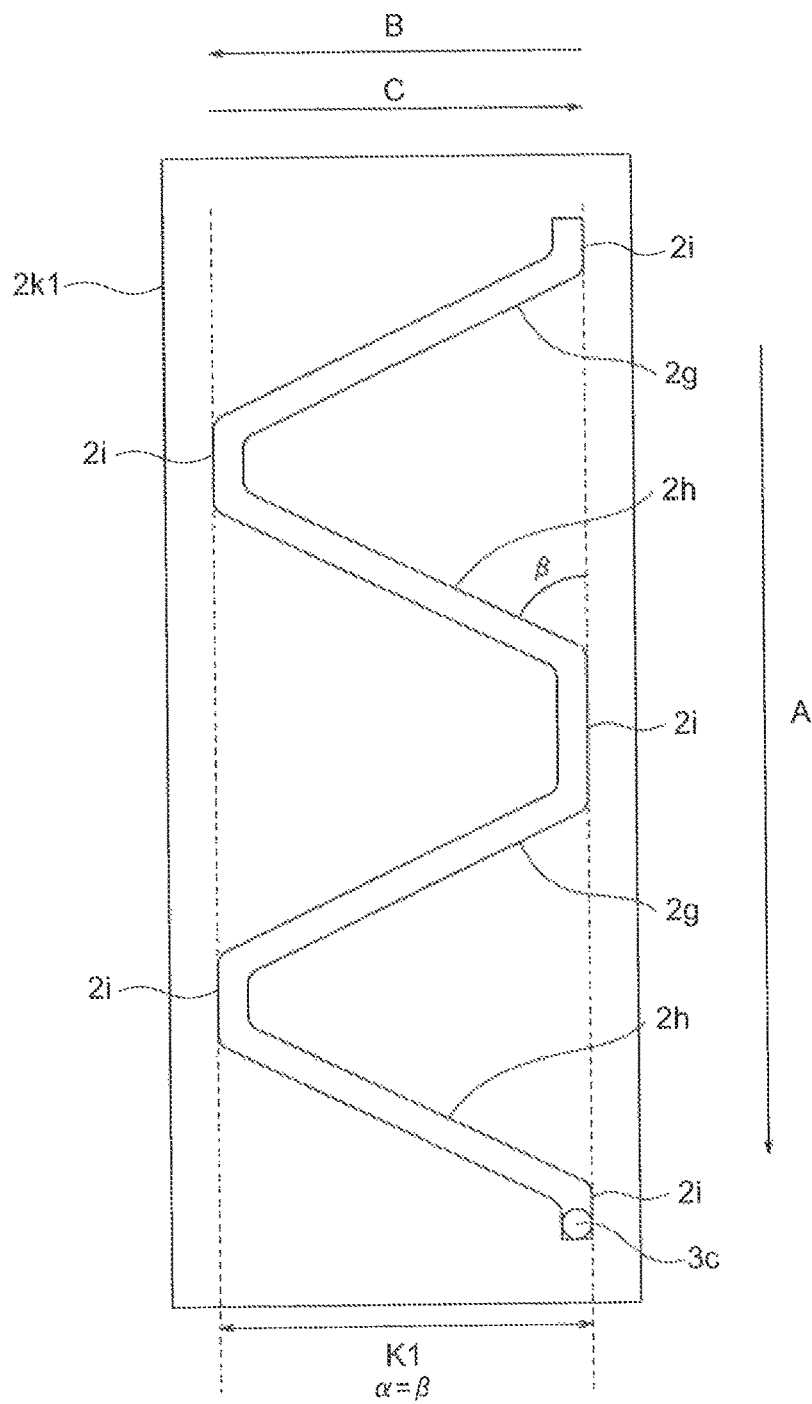

FIG. 12 is an extended elevation illustrating a cam groove configuration of the developer supply container.

Figure 13:
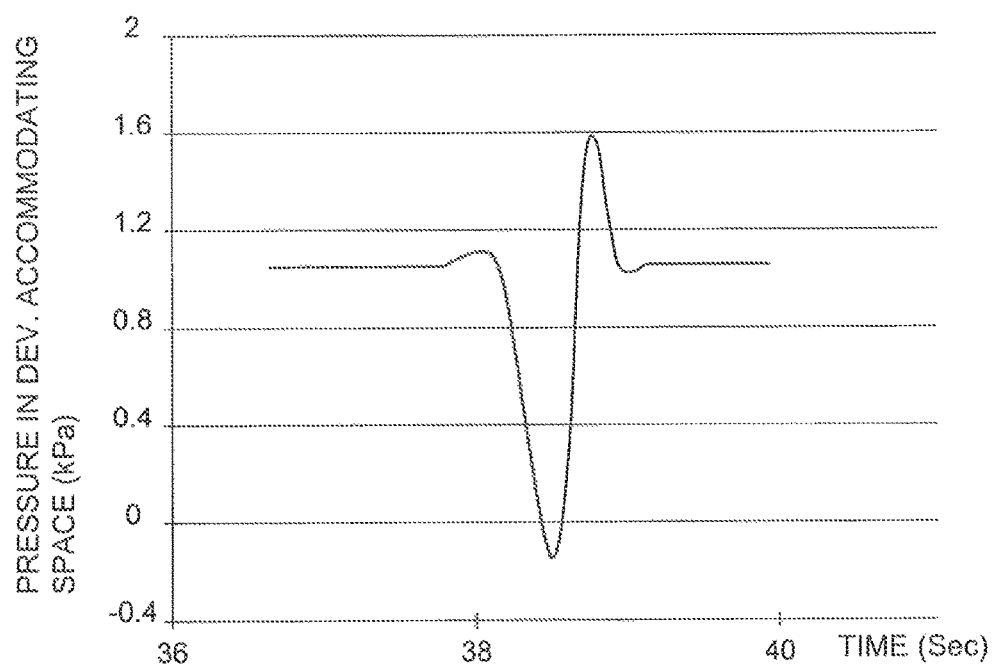

FIG. 13 illustrates a change of an internal pressure of the developer supply container.

Figure 14:
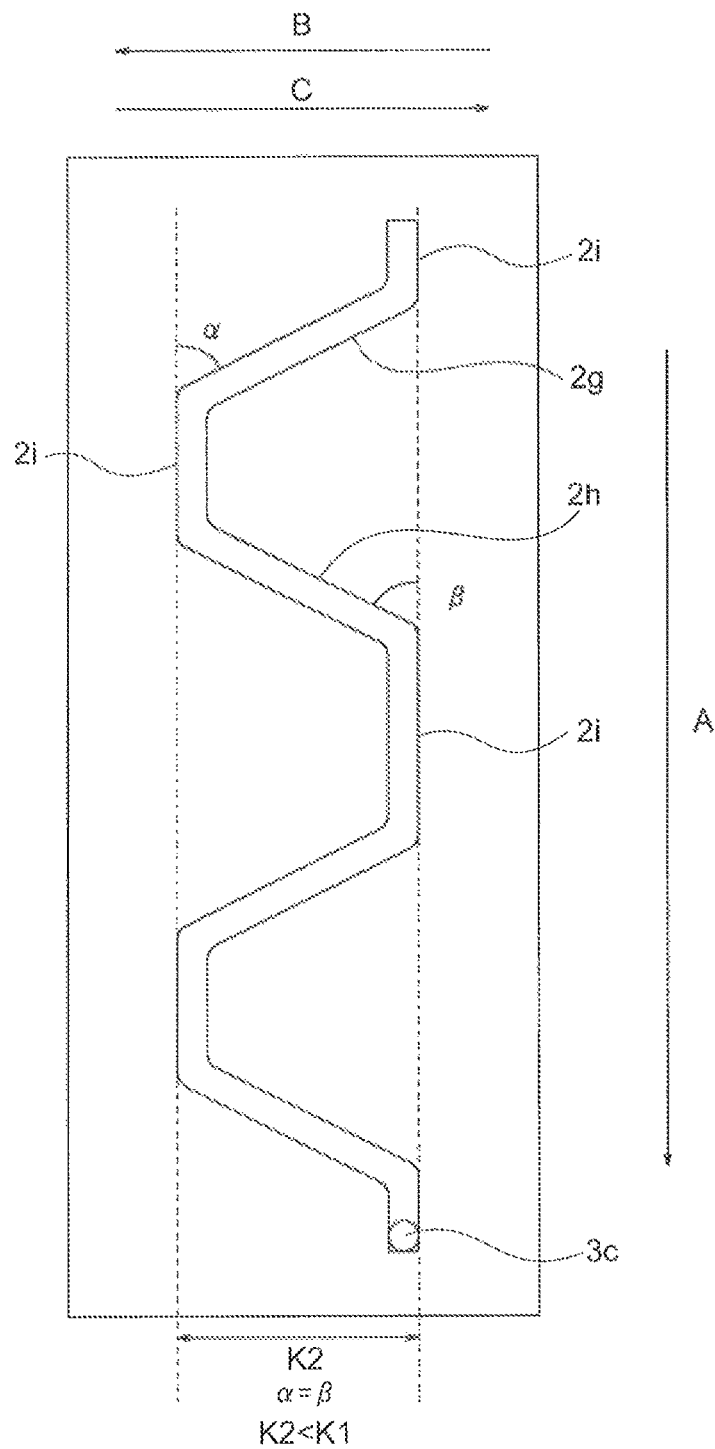

FIG. 14 is an extended elevation of an example of the cam groove configuration of the developer supply container.

Figure 15:
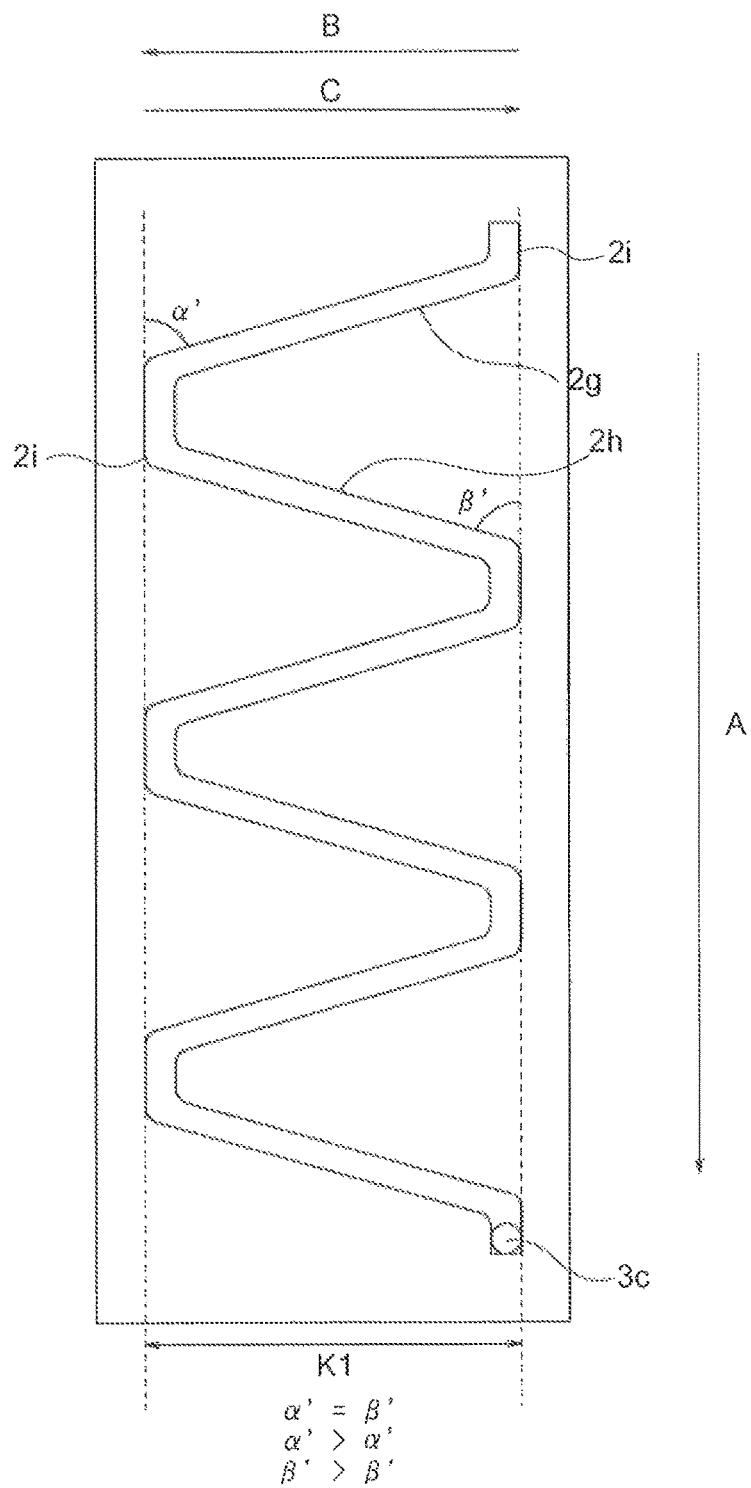

FIG. 15 is an extended elevation of an example of the cam groove configuration of the developer supply container.

Figure 16:
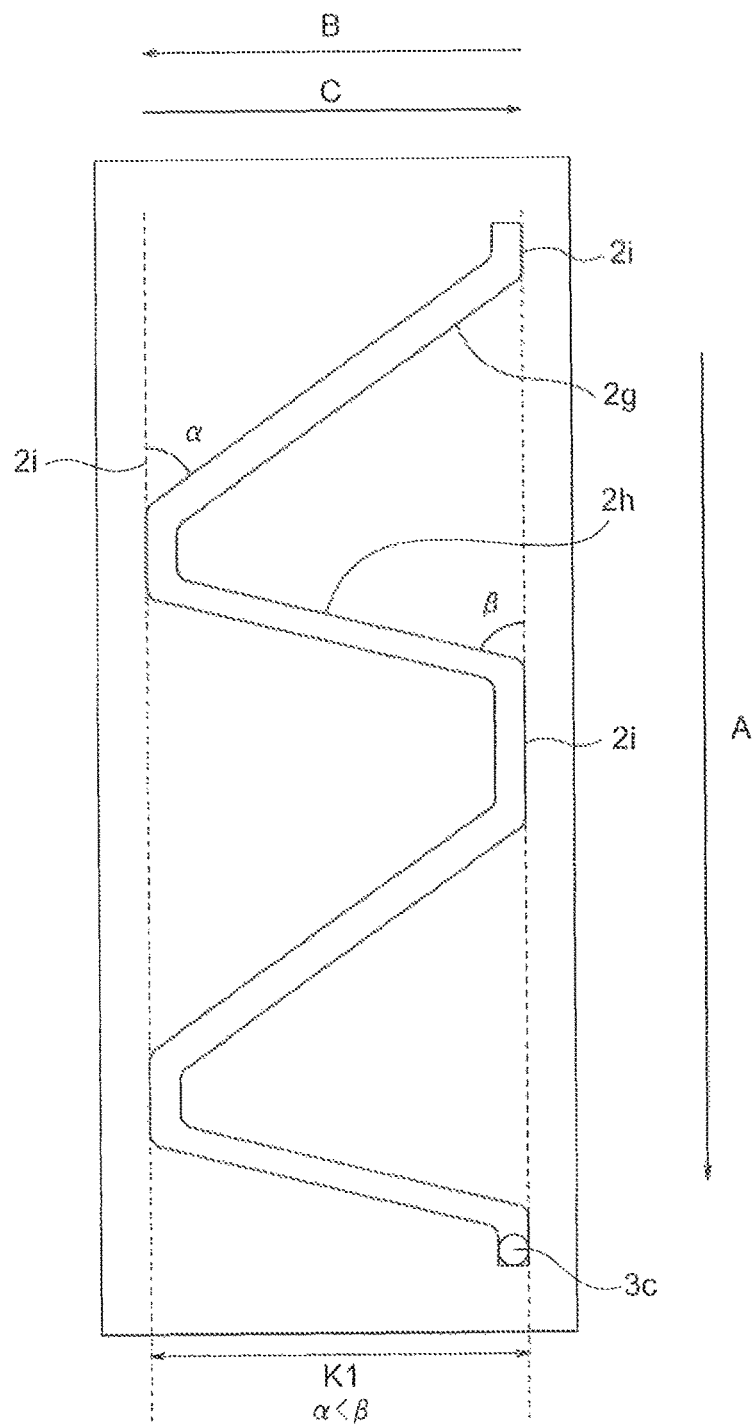

FIG. 16 is an extended elevation of an example of the cam groove configuration of the developer supply container.

Figure 17:
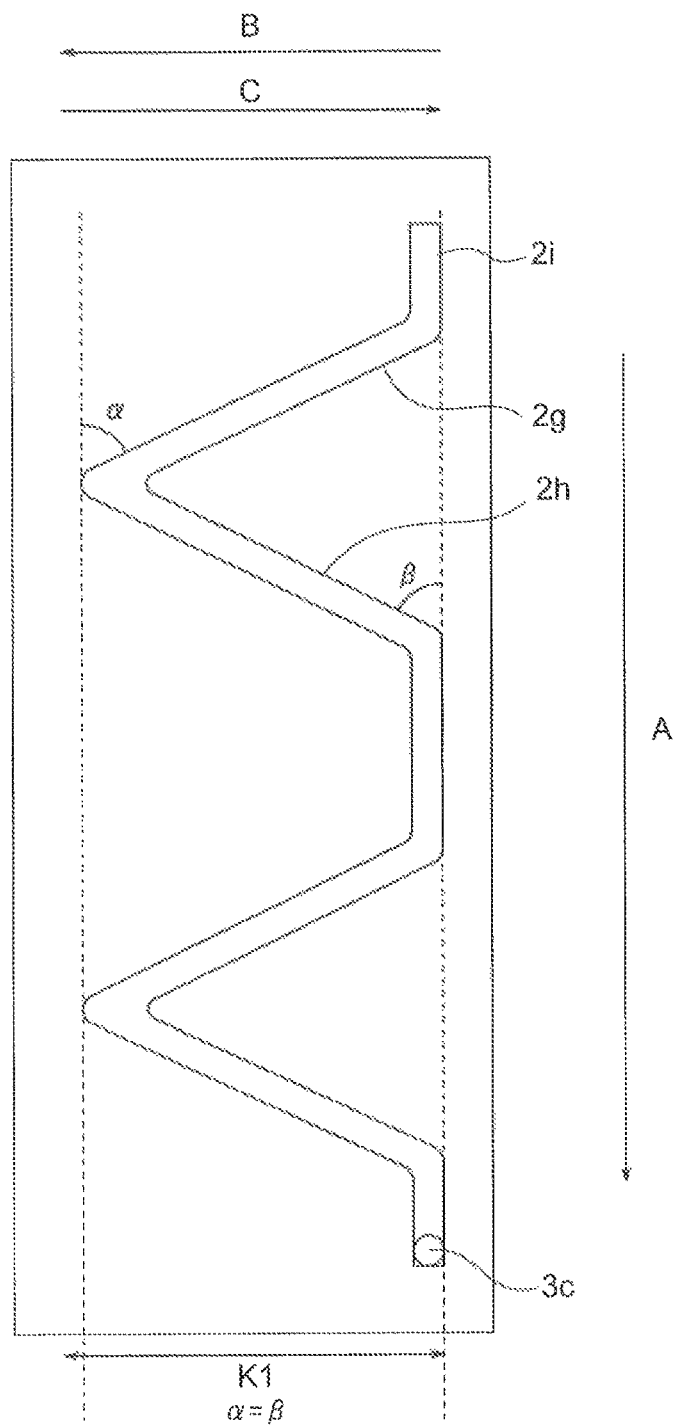

FIG. 17 is an extended elevation of an example of the cam groove configuration of the developer supply container.

Figure 18:
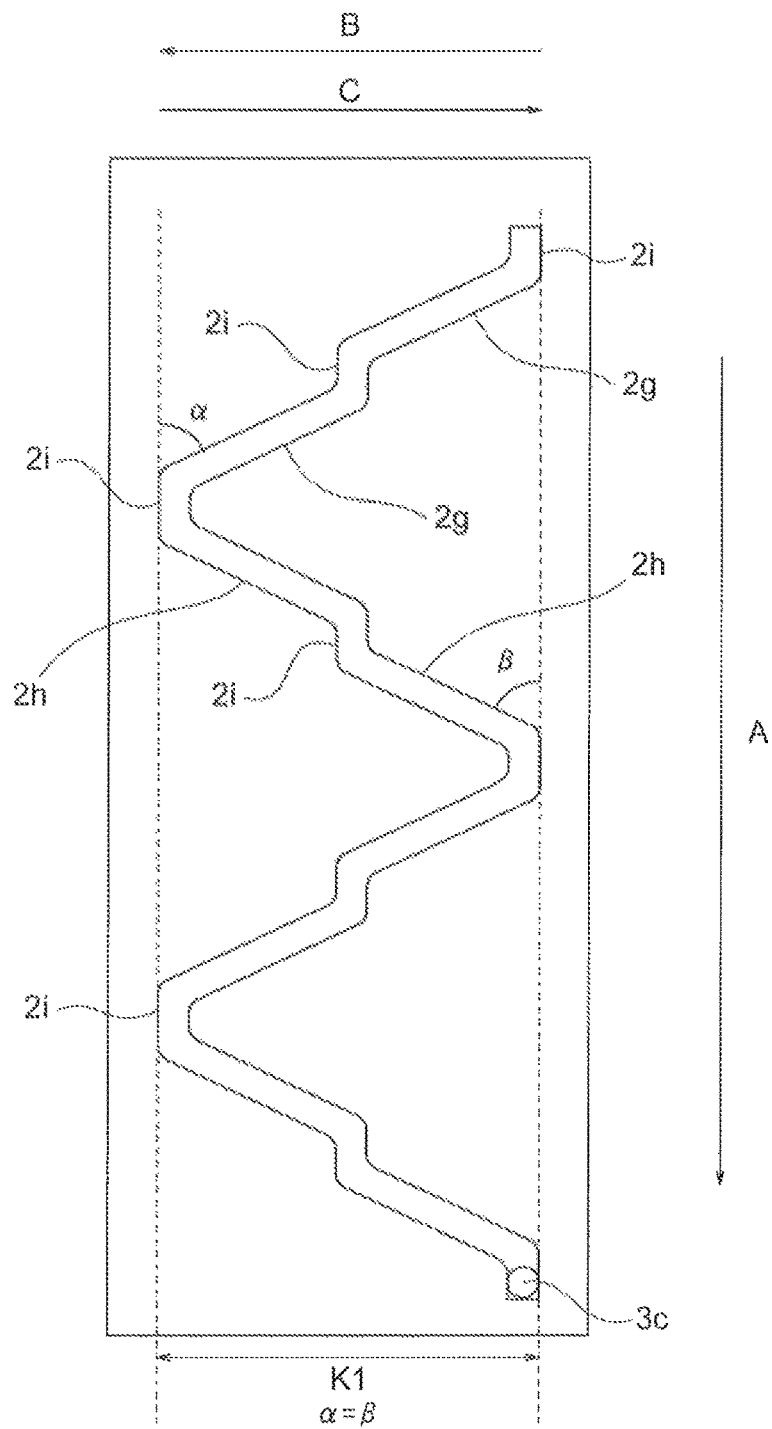

FIG. 18 is an extended elevation of an example of the cam groove configuration of the developer supply container.

Figure 19:
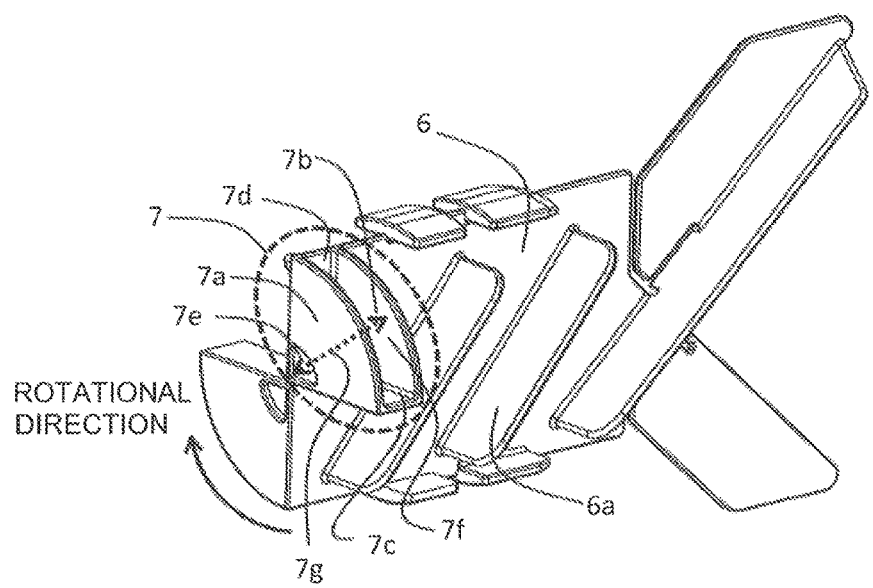
Figure 19:
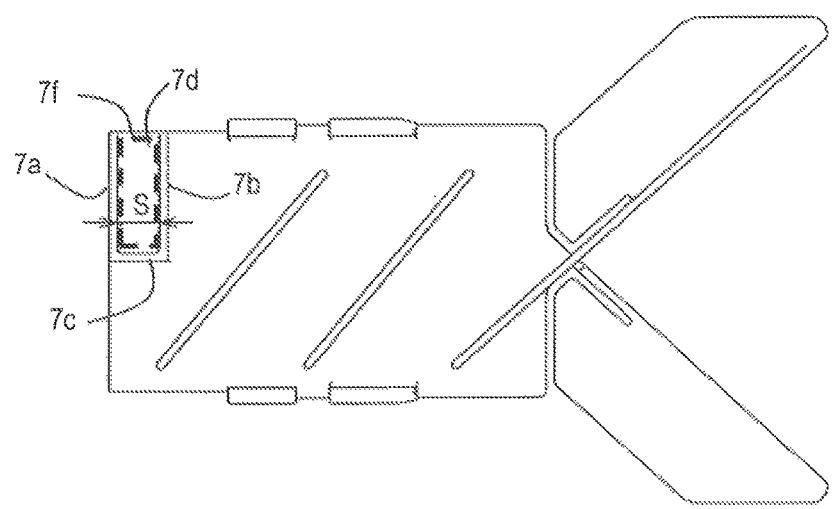

Part (a) of FIG. 19 is a perspective view of an entirety of a feeding member according to Embodiment 1 of the present invention, (b) as a side view of the feeding member.

Figure 20:
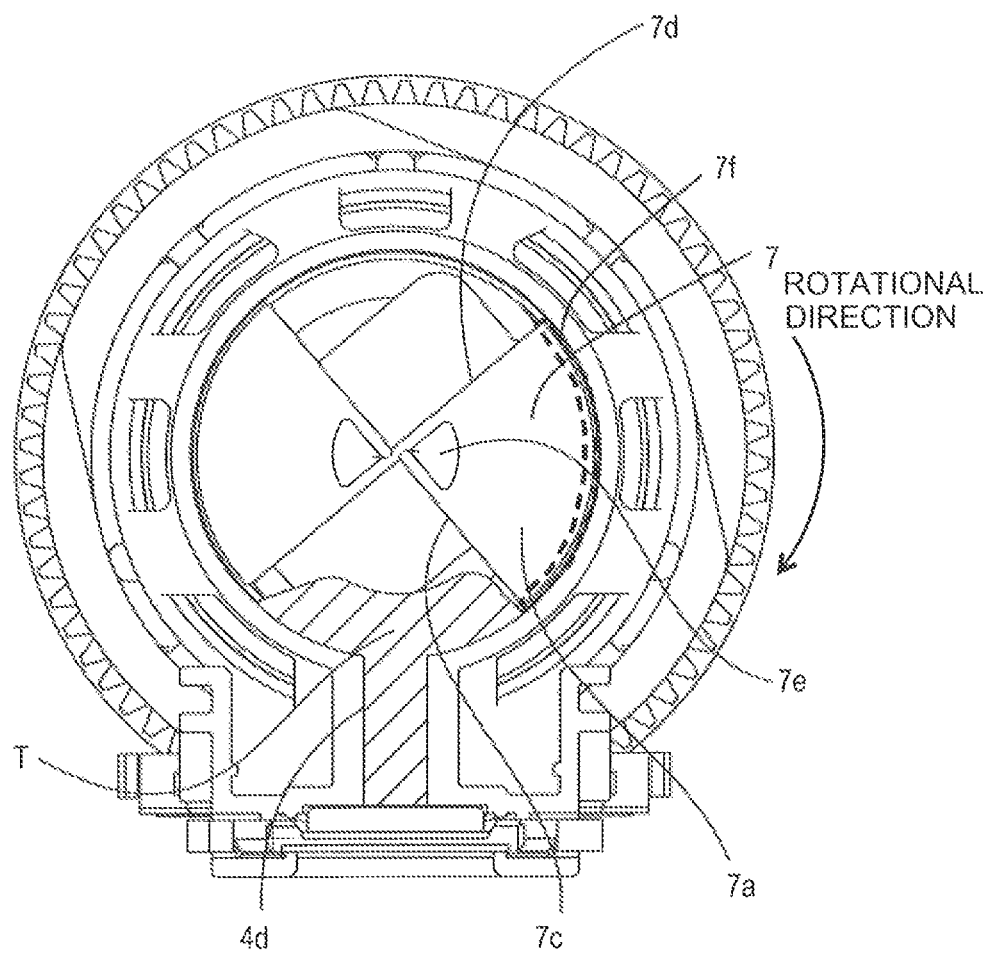

FIG. 20 is a sectional view of a discharging portion of the pump portion in the operation rest stroke, in Embodiment 1.

Figure 21:
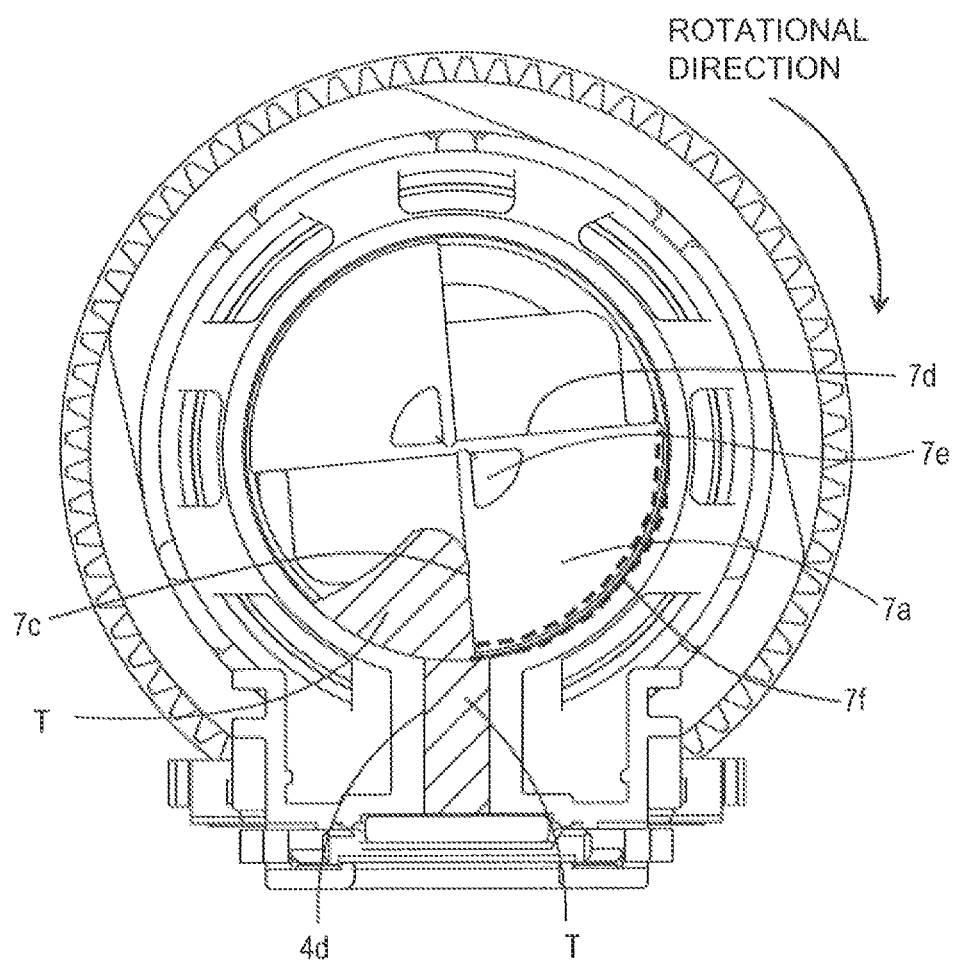

FIG. 21 is a sectional view of the discharging portion in the suction operation in Embodiment 1.

Figure 22:
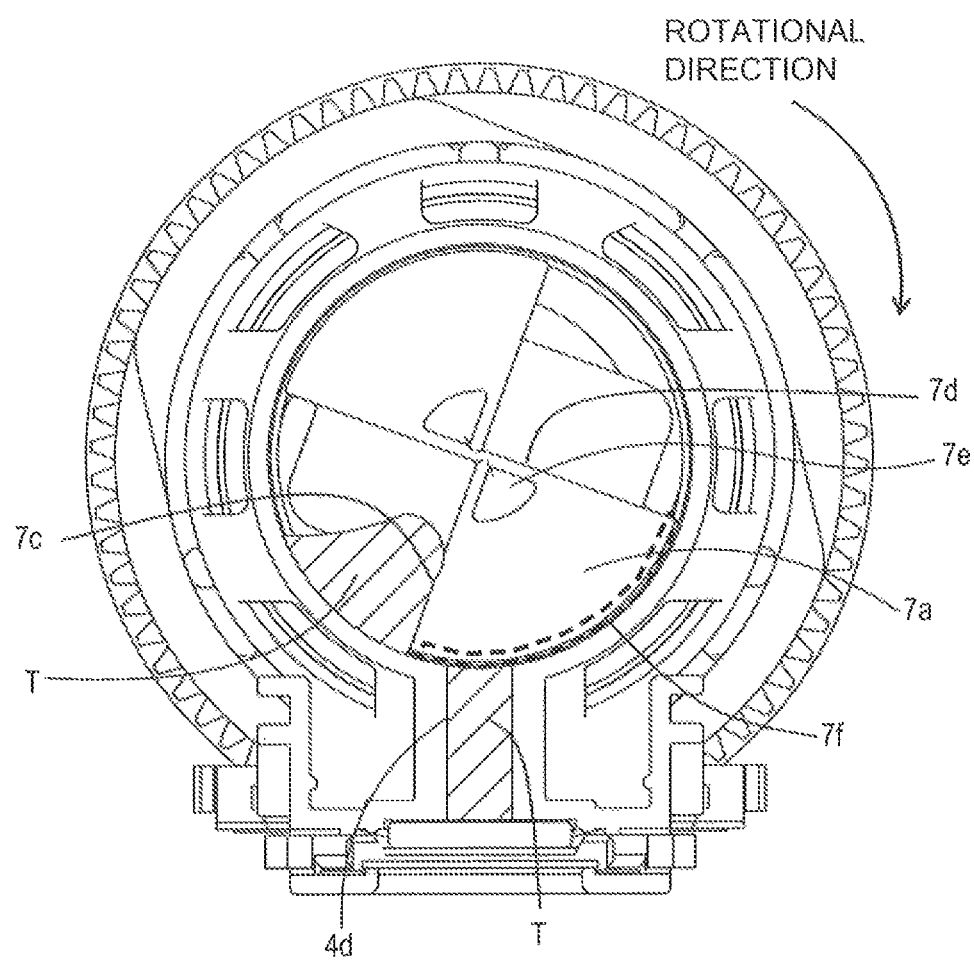

FIG. 22 is a sectional view of the discharging portion in the discharging operation in Embodiment 1.

Figure 23:
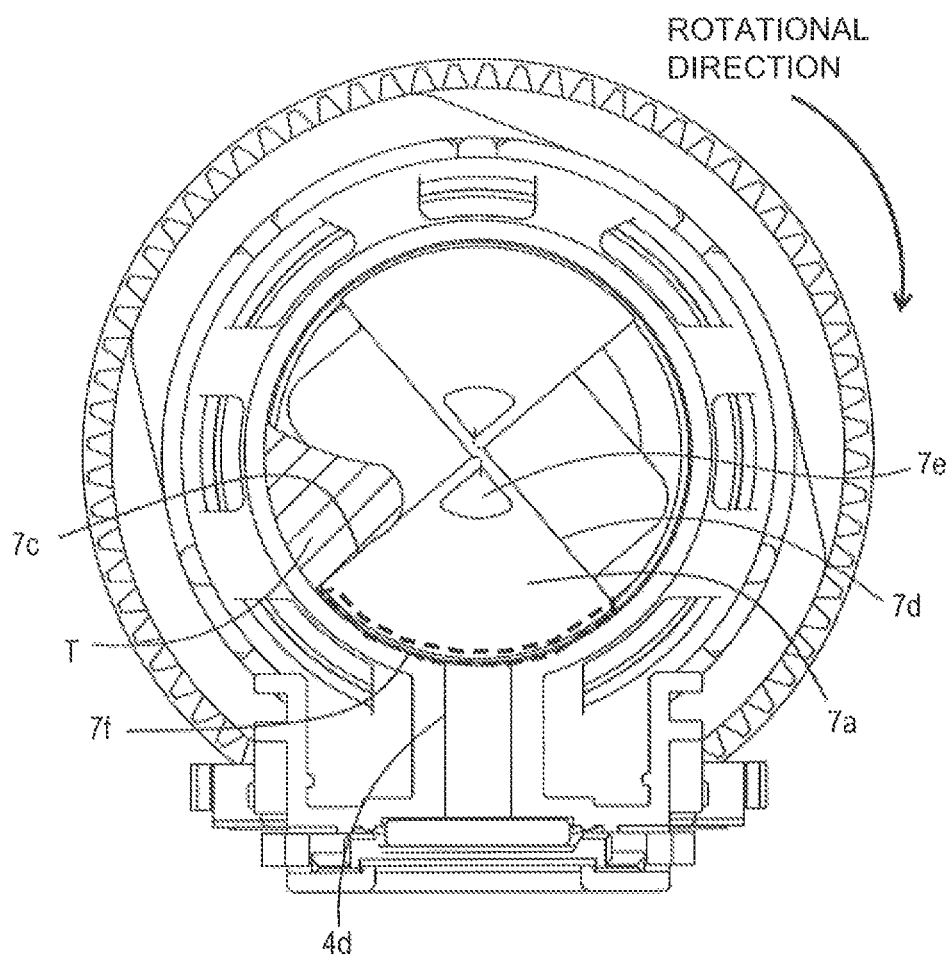

FIG. 23 is a sectional view of the discharging portion after the other developer is discharged, in Embodiment 1.

Figure 24:
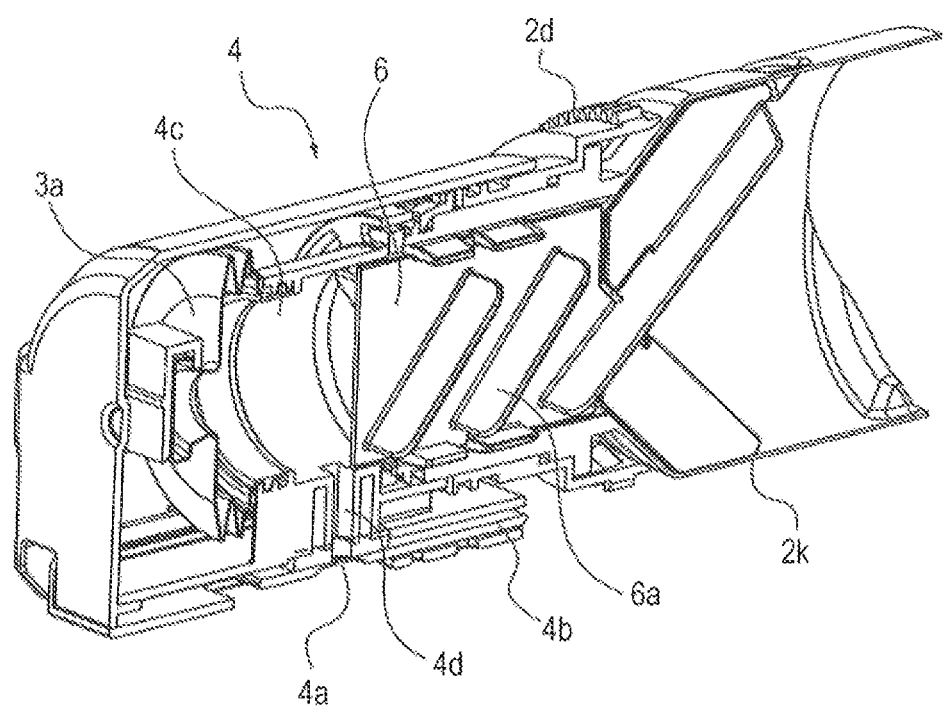

FIG. 24 is a sectional perspective view of a developer supply container according to a comparison example.

Figure 25:
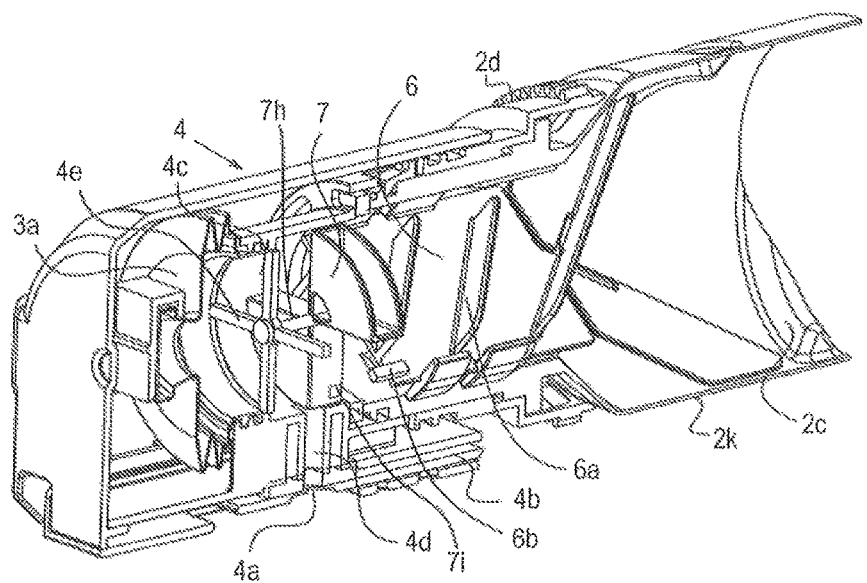
Figure 25:
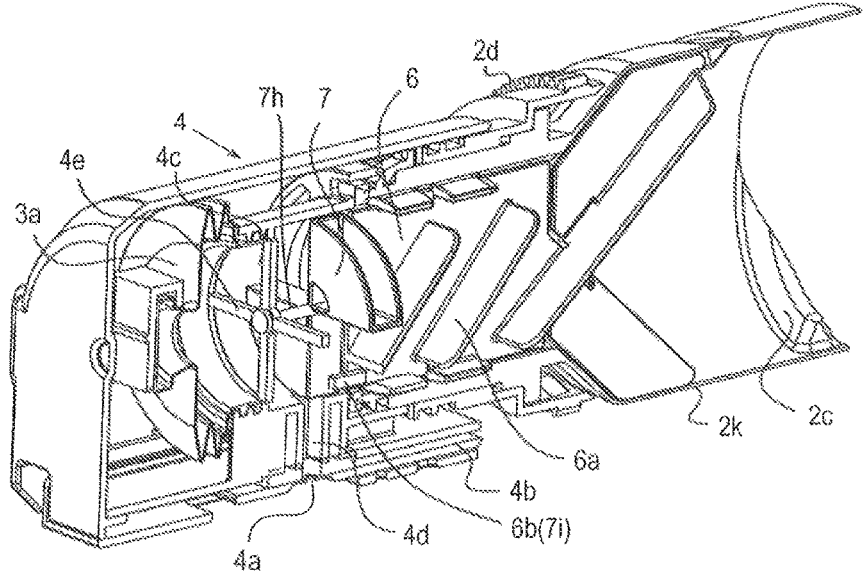

FIG. 25 is a sectional perspective view of a modified example of Embodiment 1.

Figure 26:
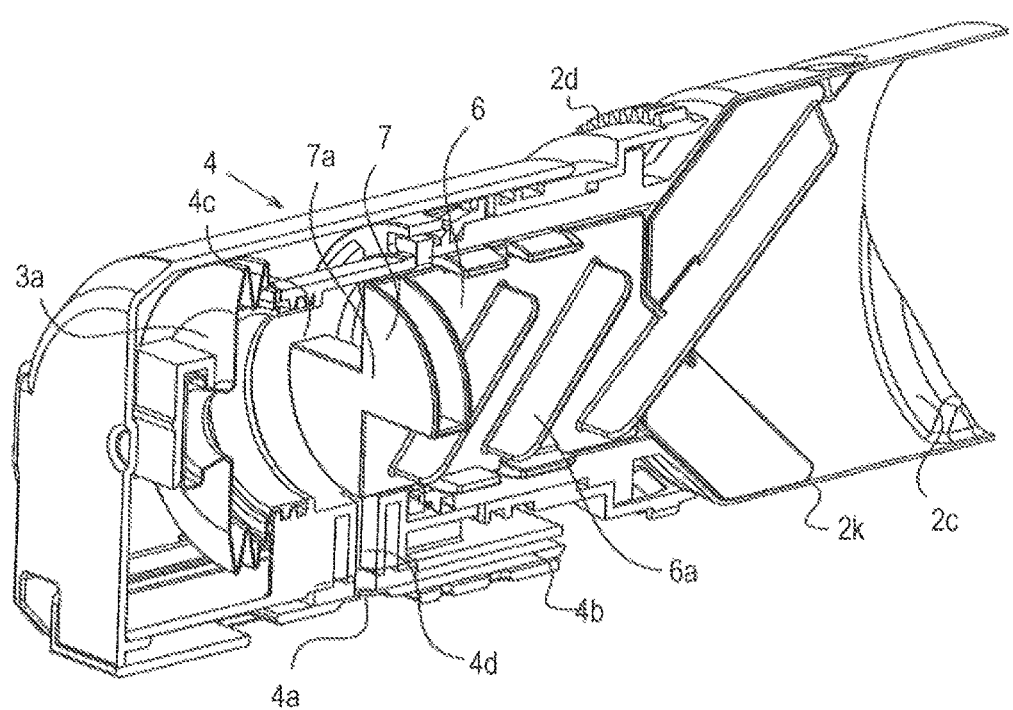

FIG. 26 is a partially explored perspective view of a part of a section of a developer supply container according to Embodiment 2 of the present invention.

Figure 27:
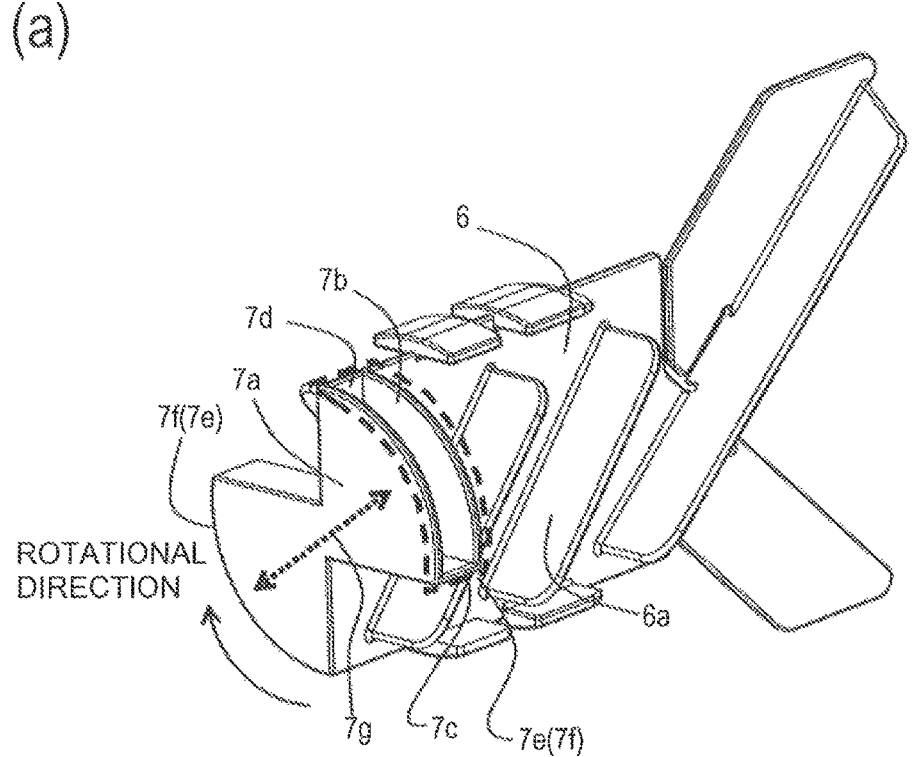
Figure 27:
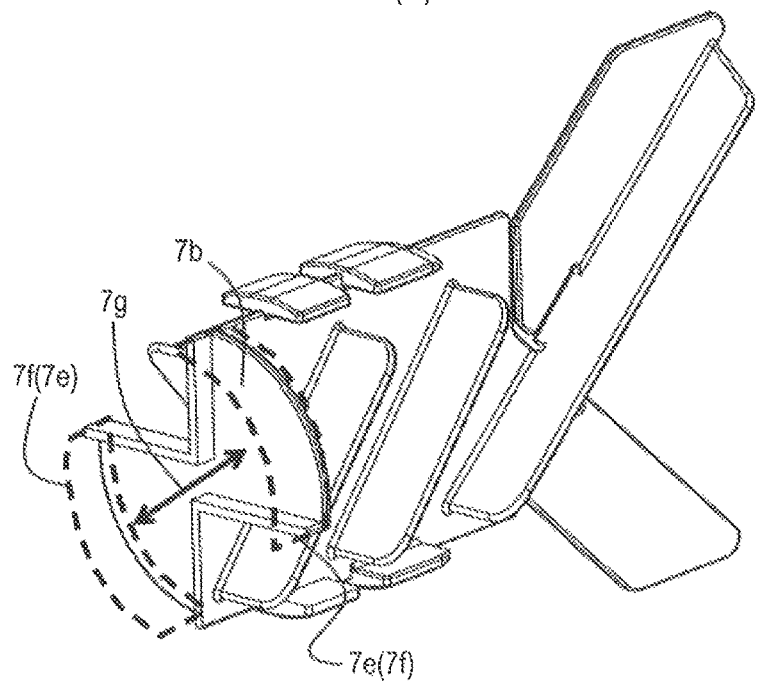

Part (a) of FIG. 27 is a partially exploded perspective view of an entirety of the feeding member in Embodiment 2, and (b) is a partly exploded perspective view of the feeding member.

Figure 28:
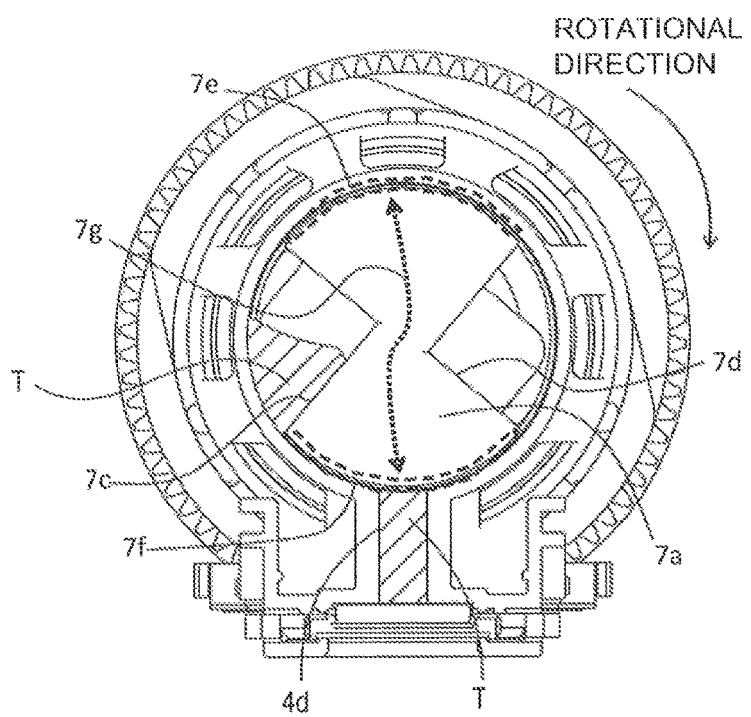
Figure 28:
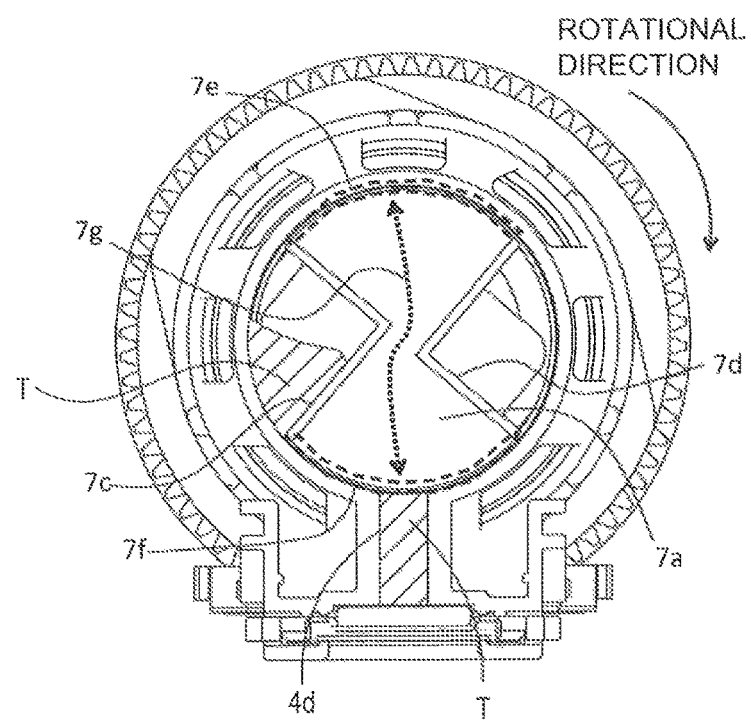

Parts (a) and (b) of FIG. 28 are sectional views of the discharging portion in the discharging, in Embodiment 2.

DESCRIPTION OF THE EMBODIMENTS

In the following, the description will be made as to a developer supply container and a developer supplying system according to the present invention in detail. In the following description, various structures of the developer supply container may be replaced with other known structures having similar functions within the scope of the concept of invention unless otherwise stated. In other words, the present invention is not limited to the specific structures of the embodiments which will be described hereinafter, unless otherwise stated.

Embodiment 1

First, basic structures of an image forming apparatus will be described, and then, a developer supplying system, that is, a developer replenishing apparatus and a developer supply container used in the image forming apparatus will be described.

(Image Forming Apparatus)

Figure 1:
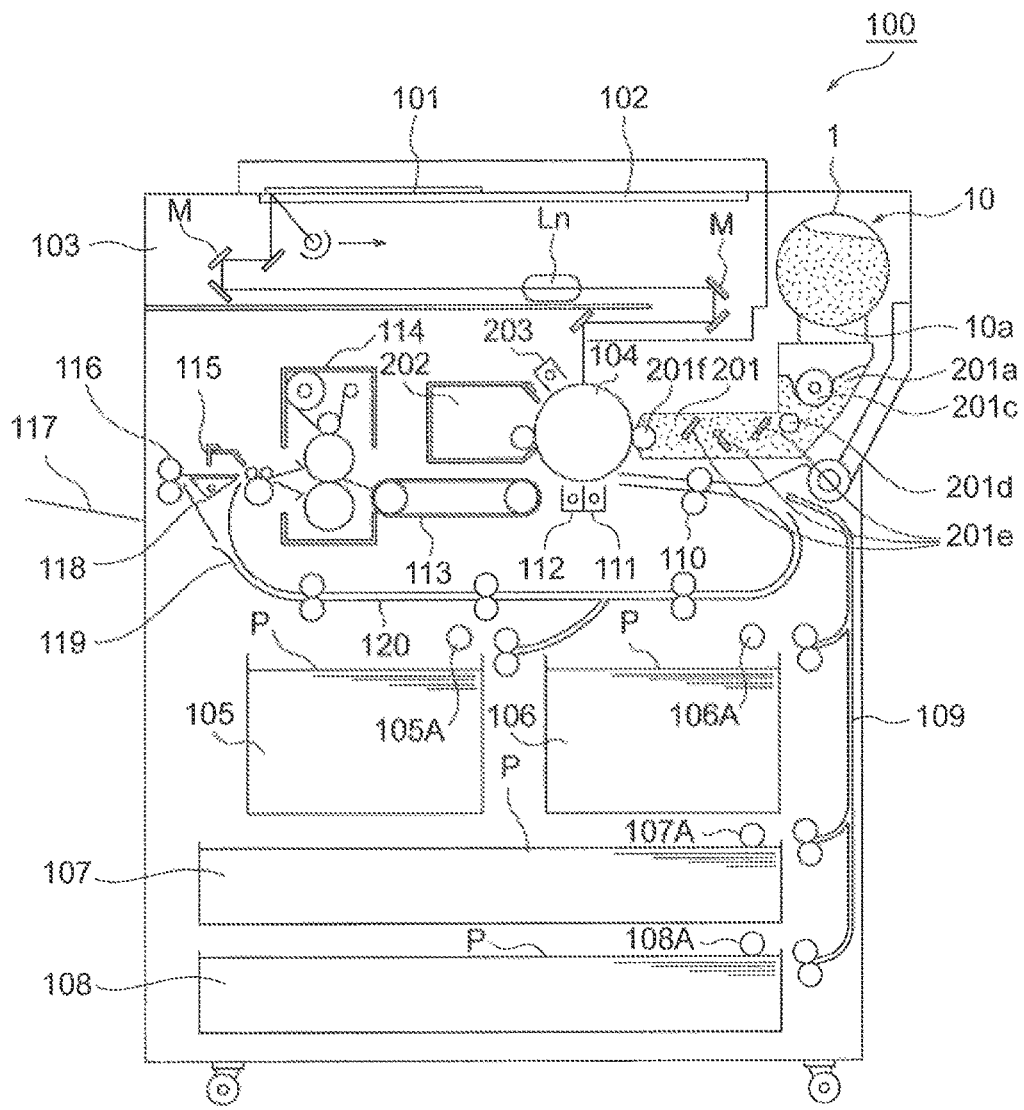
FIG. 1 is a sectional view illustrating a general arrangement of an image forming apparatus.

Referring to FIG. 1, the description will be made as to structures of a copying machine (electrophotographic image forming apparatus) employing an electrophotographic type process as an example of an image forming apparatus using a developer replenishing apparatus to which a developer supply container (so-called toner cartridge) is detachably mountable.

In the Figure, designated by 100 is a main assembly of the copying machine (main assembly of the image forming apparatus or main assembly of the apparatus). Designated by 101 is an original which is placed on an original supporting platen glass 102. A light, image corresponding to image information of the original is imaged on an electrophotographic photosensitive member 104 (photosensitive member) by way of a plurality of mirrors M of an optical portion 103 and a lens Ln, so that an electrostatic latent image is formed. The electrostatic latent image is visualized with toner (one component magnetic toner) as a developer (dry powder) by a dry type developing device (one component developing device) 201a.

In this embodiment, the one component magnetic toner is used as the developer to be supplied from a developer supply container 1, but the present invention is not limited to the example and includes other examples which will be described hereinafter.

Specifically, in the case that a one component developing device using the one component non-magnetic toner is employed, the one component non-magnetic toner is supplied as the developer. In addition, in the case that a two component developing device using a two component developer containing mixed magnetic carrier and non-magnetic toner is employed, the non-magnetic toner is supplied as the developer. In such a case, both of the non-magnetic toner and the magnetic carrier may be supplied as the developer.

Designated by 105-108 are cassettes accommodating recording materials (sheets) S. Of the sheet S stacked in the cassettes 105-108, an optimum cassette is selected on the basis of a sheet size of the original 101 or information inputted by the operator (user) from a liquid crystal operating portion of the copying machine. The recording material is not limited to a sheet of paper, but OHP sheet or another material can be used as desired.

One sheet S supplied by a separation and feeding device 105A-108A is fed to registration rollers 110 along a feeding portion 109, and is fed at timing synchronized with rotation of a photosensitive member 104 and with scanning of an optical portion 103.

Designated by 111, 112 are a transfer charger and a separation charger. An image of the developer formed on the photosensitive member 104 is transferred onto the sheet S by a transfer charger 111. Then, the sheet S carrying the developed image (toner image) transferred thereonto is separated from the photosensitive member 104 by the separation charger 112.

Thereafter, the sheet S fed by the feeding portion 113 is subjected to heat and pressure in a fixing portion 114 so that the developed image on the sheet is fixed, and then passes through a discharging/reversing portion 115, in the case of one-sided copy mode, and subsequently the sheet S is discharged to a discharging tray 117 by discharging rollers 116.

In the case of a duplex copy mode, the sheet S enters the discharging/reversing portion 115 and a part thereof is ejected once to an outside of the apparatus by the discharging roller 116. The trailing end thereof passes through a flapper 118, and a flapper 118 is controlled when it is still nipped by the discharging rollers 116, and the discharging rollers 116 are rotated reversely, so that the sheet S is refed into the apparatus. Then, the sheet S is fed to the registration rollers 110 by way of re-feeding portions 119, 120, and then conveyed along the path similarly to the case of the one-sided copy mode and is discharged to the discharging tray 117.

In the main assembly of the apparatus 100, around the photosensitive member 104, there are provided image forming process equipment (process means) such as a developing device 201a as the developing means a cleaner portion 202 as a cleaning means, a primary charger 203 as charging means. The developing device 201a develops the electrostatic latent image formed on the photosensitive member 104 by the optical portion 103 in accordance with image information of the 101, by depositing the developer (toner) onto the latent image.

The primary charger 203 functions to uniformly charge the surface of the photosensitive member 104 so that an intended electrostatic image is formed on the photosensitive member 104. In addition, the cleanup portion 202 is to remove the developer remaining on the photosensitive member 104.

(Developer Supplying Apparatus)

Referring to FIGS. 1-4, a developer replenishing apparatus 201 which is a constituent-element of the developer supplying system will be described. Part (a) of FIG. 2 is a partially sectional view of the developer supplying apparatus, (b) is a perspective view of a mounting portion, and (c) is a sectional view of the mounting portion.

FIG. 3 is partly enlarged sectional views of a control system, the developer supply container 1 and the developer replenishing apparatus 201. FIG. 4 is a flow chart illustrating a flow of developer supply operation by the control system.

As shown in FIG. 1, the developer replenishing apparatus 201 comprises the mounting portion (mounting space) 10, to which the developer supply container 1 is mounted demountably, a hopper 10a for storing temporarily the developer discharged from the developer supply container 1, and the developing device 201a 999 and the 9. As shown in part (c) of FIG. 2, the developer supply container 1 is mountable in a direction indicated by an arrow M to the mounting portion 10. Thus, a longitudinal direction (rotational axis direction) of the developer supply container 1 is substantially the same as the direction of arrow M. The direction of arrow M is substantially parallel with a direction indicated by X of part (b) of FIG. 7 which will be described hereinafter. In addition, a dismounting direction of the developer supply container 1 from the mounting portion 10 is opposite the direction (inserting direction) of the arrow M.

As shown in parts (a) of FIGS. 1 and 2, the developing device 201a comprises a developing roller 201f, a stirring member 201c, and feeding members 201d and 201e. The developer supplied from the developer supply container 1 is stirred by the stirring member 201c, is fed to the developing roller 201f by the magnet roller 201d and the feeding member 201e, and is supplied to the photosensitive member 104 by the developing roller 201f.

A developing blade 201g for regulating an amount of developer coating on the roller is provided relative to the developing roller 201f, and a leakage preventing sheet 201h is provided contacted to the developing roller 201f to prevent leakage of the developer between the developing device 201a and the developing roller 201f.

As shown in part (b) of FIG. 2, the mounting portion 10 is provided with a rotation regulating portion (holding mechanism) 11 for limiting movement of the flange portion 4 in the rotational moving direction by abutting to a flange portion 4 (FIG. 6) of the developer supply container 1 when the developer supply container 1 is mounted.

Furthermore, the mounting portion 10 is provided with a developer receiving port (developer reception hole) 13 for receiving the developer discharged from the developer supply container 1, and the developer receiving port is brought into fluid communication with a discharge opening (discharging port) 4a (FIG. 6) of the developer supply container 1 which will be described hereinafter, when the developer supply container 1 is mounted thereto. The developer is supplied from the discharge opening 4a of the developer supply container 1 to the developing device 201a through the developer receiving port 13. In this embodiment, a diameter φ of the developer receiving port 13 is approx. 3 mm (pin hole), for the purpose of preventing as much as possible the contamination by the developer in the mounting portion 10. The diameter of the developer receiving port may be any if the developer can be discharged through the discharge opening 4a.

As shown in FIG. 3, the hopper 10a comprises a feeding screw 10b for feeding the developer to the developing device 201a an opening 10c in fluid communication with the developing device 201a and a developer sensor 10d for detecting an amount of the developer accommodated in the hopper 10a.

As shown in parts (b) and (c) of FIG. 2, the mounting portion 10 is provided with a driving gear 300 functioning as a driving mechanism (driver). The driving gear 300 receives a rotational force from a driving motor 500 (unshown) through a driving gear train, and functions to apply a rotational force to the developer supply container 1 which is set in the mounting portion 10.

As shown in FIG. 3, the driving motor 500 is controlled by a control device (CPU) 600. As shown in FIG. 3, the control device 600 controls the operation of the driving motor 500 on the basis of information indicative of a developer remainder inputted from the developer sensor 10d.

In this example, the driving gear 300 is rotatable unidirectionally to simplify the control for the driving motor 500. The control device 600 controls only ON (operation) and OFF (non-operation) of the driving motor 500. This simplifies the driving mechanism for the developer replenishing apparatus 201 as compared with a structure in which forward and backward driving forces are provided by periodically rotating the driving motor 500 (driving gear 300) in the forward direction and backward direction.

(Mounting/Dismounting Method of Developer Supply Container)

The description will be made as to mounting/dismounting method of the developer supply container 1.

First, the operator opens an exchange cover and inserts and mounts the developer supply container 1 to a mounting portion 10 of the developer replenishing apparatus 201 at the mounting operation, the flange portion 4 of the developer supply container 1 is held and fixed in the developer replenishing apparatus 201.

Thereafter, the operator closes the exchange cover to complete the mounting step. Thereafter, the control device 600 controls the driving motor 500, by which the driving gear 300 rotates at proper timing.

On the other hand, when the developer supply container 1 becomes empty, the operator opens the exchange cover and takes the developer supply container 1 out of the mounting portion 10. The operator inserts and mounts a new developer supply container 1 prepared beforehand and closes the exchange cover, by which the exchanging operation from the removal to the remounting of the developer supply container 1 is completed.

(Developer Supply Control by Developer Replenishing Apparatus)

Referring to a flow chart of FIG. 4, a developer supply control by the developer replenishing apparatus 201 will be described. The developer supply control is executed by controlling various equipment by the control device (CPU) 600.

In this example, the control device 600 controls the operation/non-operation of the driving motor 500 in accordance with an output of the developer sensor 10d by which the developer is not accommodated in the hopper 10a beyond a predetermined amount.

More particularly, first, the developer sensor 10d checks the accommodated developer amount in the hopper 10a.

When the accommodated developer amount detected by the developer sensor 10d is discriminated as being less than a predetermined amount, that is, when no developer is detected by the developer sensor 10d, the driving motor 500 is actuated to execute a developer supplying operation for a predetermined time period (S101).

The accommodated developer amount detected with developer sensor 10d is discrimination ed as having reached the predetermined amount, that is, when the developer is detected by the developer sensor 10d, as a result of the developer supplying operation, the driving motor 500 is deactuated to stop the developer supplying operation (S102). By the stop of the supplying operation, a series of developer supplying steps is completed.

Such developer supplying steps are carried out repeatedly whenever the accommodated developer amount in the hopper 10a becomes less than a predetermined amount as a result of consumption of the developer by the image forming operations.

The structure may be such that the developer discharged from the developer supply container 1 is stored temporarily in the hopper 10a, and then is supplied into the developing device 201a. More specifically, the following structure of the developer replenishing apparatus 201 can be employed.

As shown in FIG. 5, the above-described hopper 10a is omitted, and the developer is supplied directly into the developing device 201a from the developer supply container 1. FIG. 5 shows an example using a two component developing device 800 as a developer replenishing apparatus 201. The developing device 800 comprises a stirring chamber into which the developer is supplied, and a developer chamber for supplying the developer to the developing sleeve 800a, wherein the stirring chamber and the developer chamber are provided with stirring screws 800b rotatable in such directions that the developer is fed in the opposite directions from each other. The stirring chamber and the developer chamber are communicated with each other in the opposite longitudinal end portions, and the two component developer are circulated the two chambers. The stirring chamber is provided with a magnetometric sensor 800c for detecting a toner content of the developer, and on the basis of the detection result of the magnetometric sensor 800c, the control device 600 controls the operation of the driving motor 500. In such a case, the developer supplied from the developer supply-container is non-magnetic toner or non-magnetic toner plus magnetic carrier.

In this example, as will be described hereinafter, the developer in the developer supply container 1 is hardly discharged through the discharge opening 4a only by the gravitation, but the developer is discharged by a volume changing operation of a pump portion 3b, and therefore, variation in the discharge amount can be suppressed. Therefore, the developer supply container 1 which will be described hereinafter is usable for the example of FIG. 5 lacking the hopper 10a, and the supply of the developer into the developing chamber is stable with such a structure.

(Developer Supply Container)

Referring to FIGS. 6 and 7, the structure of the developer supply container 1 which is a constituent-element of the developer supplying system will be described. Part (a) of FIG. 6 is a perspective view illustrating the developer supply container according to Embodiment 1 of the present invention, (b) is a partial enlarged view illustrating a state around a discharge opening, and (c) is a front view illustrating a state in which the developer supply container is mounted to the mounting portion of the developer supplying apparatus. Part (a) of FIG. 7 is a perspective view of a section of the developer supply container. Part (b) of FIG. 7 is a partially sectional view in a state in which the pump portion is expanded to the maximum usable limit, and (b) is a partially sectional view in a state in which the pump portion is contracted to the maximum usable limit.

As shown in part (a) of FIG. 6, the developer supply container 1 includes a developer accommodating portion 2 (container body) having a hollow cylindrical inside space for accommodating the developer. In this example, a cylindrical portion 2k, the discharging portion 4c and the pump portion 3b (FIG. 5) function as the developer accommodating portion 2. Furthermore, the developer supply container 1 is provided with a flange portion 4 (non-rotatable portion) at one end of the developer accommodating portion 2 with respect to the longitudinal direction (developer feeding direction). The cylindrical portion 2 is rotatable relative to the flange portion 4. A cross-sectional configuration of the cylindrical portion 2k may be non-circular as long as the non-circular shape does not adversely affect the rotating operation in the developer supplying step. For example, it may be oval configuration, polygonal configuration or the like.

In this example, as shown in part (b) of FIG. 7, a total length L1 of the cylindrical portion 2k functioning as the developer accommodating chamber is approx. 460 mm, and an outer diameter R1 is approx. 60 mm. A length L2 of the range in which the discharging portion 4c functioning as the developer discharging chamber is approx. 21 mm. A total length L3 of the pump portion 3b (in the state that it is most expanded in the expansible range in use) is approx. 29 mm, and a total length L4 of the pump portion 3a (in the state that it is most contracted in the expansible range in use) is approx. 24.

As shown in FIGS. 6, 7, in this example, in the state that the developer supply container 1 is mounted to the developer replenishing apparatus 201, the cylindrical portion 2k and the discharging portion 4c are substantially on line along a horizontal direction. That is, the cylindrical portion 2k has a sufficiently long length in the horizontal direction as compared with the length in the vertical direction, and one end part with respect to the horizontal direction is connected with the discharging portion 4c. For this reason, an amount of the developer existing above the discharge opening 4a which will be described hereinafter can be made smaller as compared with the case in, which the cylindrical portion 2k is above the discharging portion 4c in the state that the developer supply container 1 is mounted to the developer replenishing apparatus 201. Therefore, the developer in the neighborhood of the discharge opening 4a is less compressed, thus accomplishing smooth suction and discharging operation.

(Material of Developer Supply Container)

In this example, as will be described hereinafter, the developer is discharged through the discharge opening 4a by changing an internal volume of the developer supply container 1 by the pump portion 3a. Therefore, the material of the developer supply container 1 is preferably such that it provides an enough rigidity to avoid collision or extreme expansion against the volume change.

In addition, in this example, the developer supply container 1 is in fluid communication with an outside only through the discharge opening 4a, and is sealed except for the discharge opening 4a. Such a hermetical property as is enough to maintain a stabilized discharging performance in the discharging operation of the developer through the discharge opening 4a is provided by the decrease and increase of the volume of developer supply container 1 by the pump portion 3a.

Under the circumstances, this example employs polystyrene resin material as the materials of the developer accommodating portion 2 and the discharging portion 4c and employs polypropylene resin material as the material of the pump portion 3a.

As for the material for the developer accommodating portion 2 and the discharging portion 4c, other resin materials such as ABS (acrylonitrile, butadiene, styrene copolymer resin material), polyester, polyethylene, polypropylene, for example are usable if they have enough durability against the volume change. Alternatively, they may be metal.

As for the material of the pump portion 3a, any material is usable if it is expansible and contractable enough to change the internal pressure of the developer supply container 1 by the volume change. The examples includes thin formed ABS (acrylonitrile, butadiene, styrene copolymer resin material), polystyrene, polyester, polyethylene materials. Alternatively, other expandable-and-contractable materials such as rubber are usable.

They may be integrally molded of the same material through an injection molding method, a blow molding method or the like if the thicknesses are properly adjusted for the pump portion 3a, developer accommodating portion 2 and the discharging portion 3h, respectively.

In the following, the description will be made as to the structures of the flange portion 4, the cylindrical portion 2k, the pump portion 3a, the drive receiving mechanism 2d, a drive converting mechanism 2e (cam groove) in the developer supply container.

(Flange Portion)

As shown in parts (a) and (b) of FIG. 7, the flange portion 4 is provided with a hollow discharging portion (developer discharging chamber) 4c for temporarily accommodating the developer having been fed from the cylindrical portion 2k. A bottom portion of the discharging portion 4c is provided with the small discharge opening 4a for permitting discharge of the developer to the outside of the developer supply container 1, that is, for supplying the developer into the developer replenishing apparatus 201. Above the discharge opening 4a, there is provided a fluid communication path 4d capable of storing a predetermined amount of the developer before the discharge thereof to provide communication between the discharge opening 4a and the inside of the developer supply container 1. The fluid communication path functions also as a developer storage portion capable of storing the constant amount of the developer before the discharging. The size of the discharge opening 4a will be described hereinafter.

The flange portion 4 is provided with a shutter 4b for opening and closing the discharge opening 4a. The shutter 4b is provided at a position such that when the developer supply container 1 is mounted to the mounting portion 10, it is abutted to an abutting portion 21 (see part (b) of FIG. 2) provided in the mounting portion 10. Therefore, the shutter 4b slides relative to the developer supply container 1 in the rotational axis direction (opposite from the arrow M direction of part (c) of FIG. 2) of the cylindrical 2k with the mounting operation of the developer supply container 1 to the mounting portion 10. As a result, the discharge opening 4a is exposed through the shutter 4b, thus completing the unsealing operation.

At this time, the discharge opening 4a is positionally aligned with the developer receiving port 13 of the mounting portion 10, and therefore, they are brought into fluid communication with each other, thus enabling the developer supply from the developer supply container 1.

The flange portion 4 is constructed such that when the developer supply container 1 is mounted to the mounting portion 10 of the developer replenishing apparatus 201, it is stationary substantially.

More particularly, a rotation regulating portion 11 shown in part (b) of FIG. 2 is provided so that the flange portion 4 does not rotate in the rotational direction of the cylindrical portion 2k.

Therefore, in the state that the developer supply container 1 is mounted to the developer replenishing apparatus 201, the discharging portion 3h provided in the flange portion 3 is prevented substantially in the movement of the cylindrical portion 2k in the rotational moving direction (movement within the play is permitted).

On the other hand, the cylindrical portion 2k is not limited in the rotational moving direction by the developer replenishing apparatus 201, and therefore, is rotatable in the developer supplying step.

In addition, as shown in as shown in FIG. 7, a feeding member 6 in the form of a plate is provided to feed the developer fed from the cylindrical portion 2k by a helical projection (feeding projection) 2c to the discharging portion 4c. The feeding member 6 divides a part region of the developer accommodating portion 2 into substantially two parts, and integrally rotatable with the cylindrical portion 2k. The feeding member 6 is provided on each of the sides thereof with a plurality of inclination ribs 6a inclined toward the discharging portion 4c relative to the rotational axis direction of the cylindrical portion 2k. In the structure, an end portion of the feeding member 6 is provided with a regulating portion 7. In the details of the regulating portion 7 will be described hereinafter.

With the above-described structure, the developer fed by the feeding projection 2c is scooped up by the plate-like feeding member 6 in interrelation with the rotation of the cylindrical portion 2k. Thereafter, with the further rotation of the cylindrical portion 2k, the developer slides down on the surface of the feeding member 6 by the gravity, and sooner or later, the developer is transferred to the discharging portion 4c by the inclination ribs 6a. With this structure of this example, the inclination ribs 6a are provided on each of the sides of the feeding member 6 so that the developer is fed into the discharging portion 4c for each half of the full-turn of the cylindrical portion 2k.

(Discharge Opening of Flange Portion)

In this example, the size of the discharge opening 4a of the developer supply container 1 is so selected that in the orientation of the developer supply container 1 for supplying the developer into the developer replenishing apparatus 201, the developer is not discharged to a sufficient extent, only by the gravitation. The opening size of the discharge opening 4a is so small that the discharging of the developer from the developer supply container is insufficient only by the gravitation, and therefore, the opening is called pin hole hereinafter. In other words, the size of the opening is determined such that the discharge opening 4a is substantially clogged. This is expectedly advantageous in the following points.

(1) the developer does not easily leak through the discharge opening 4a.

(2) excessive discharging of the developer at time of opening of the discharge opening 4a can be suppressed.

(3) the discharging of the developer can rely dominantly on the discharging operation by the pump portion 3a.

The inventors have investigated as to the size of the discharge opening 4a not enough to discharge the toner to a sufficient extent only by the gravitation. The verification experiment (measuring method) and criteria will be described.

A rectangular parallelopiped container of a predetermined volume in which a discharge opening (circular) is formed at the center portion of the bottom portion is prepared, and is filled with 200 g of developer; then, the filling port is sealed, and the discharge opening is plugged; in this state, the container is shaken enough to loosen the developer. The rectangular parallelopiped container has a volume of 1000 cm$^3$, 90 mm in length, 92 mm width and 120 mm in height.

Thereafter, as soon as possible the discharge opening is unsealed in the state that the discharge opening is directed downwardly, and the amount of the developer discharged through the discharge opening is measured. At this time, the rectangular parallelopiped container is sealed completely except for the discharge opening. In addition, the verification experiments were carried out under the conditions of the temperature of 24° C. and the relative humidity of 55%.

Using these processes, the discharge amounts are measured while changing the kind of the developer and the size of the discharge opening. In this example, when the amount of the discharged developer is not more than 2 g, the amount is negligible, and therefore, the size of the discharge opening at that time is deemed as being not enough to discharge the developer sufficiently only by the gravitation.

The developers used in the verification experiment are shown in Table 1. The kinds of the developer are one component magnetic toner, non-magnetic toner for two component developer developing device and a mixture of the non-magnetic toner and the magnetic carrier.

As for property values indicative of the property of the developer, the measurements are made as to angles of rest indicating flowabilities, and fluidity energy indicating easiness of loosing of the developer layer, which is measured by a powder flowability analyzing device (Powder Rheometer FT4 available from Freeman Technology)

TABLE 1

| Developers | Volume average particle size of toner (μm) | Developer component | Angle of rest (deg.) | Fluidity energy (Bulk density of 0.5 g/cm$^3$) |
|---|---|---|---|---|
| A | 7 | Two-component non-magnetic | 18 | $2.09 \times 10^{-3}$ J |
| B | 6.5 | Two-component non-magnetic toner + carrier | 22 | $6.80 \times 10^{-4}$ J |
| C | 7 | One-component magnetic toner | 35 | $4.30 \times 10^{-4}$ J |
| D | 5.5 | Two-component non-magnetic toner + carrier | 40 | $3.51 \times 10^{-3}$ J |
| E | 5 | Two-component non-magnetic toner + carrier | 27 | $4.14 \times 10^{-3}$ J |

TABLE 1-continued

| Developers | Volume average particle size of toner (μm) | Developer component | Angle of rest (deg.) | Fluidity energy (Bulk density of 0.5 g/cm$^3$) |
|---|---|---|---|---|

Referring to FIG. 8, a measuring method for the fluidity energy will be described. Here, FIG. 8 is a schematic view of a device for measuring the fluidity energy.

The principle of the powder flowability analyzing device is that a blade is moved in a powder sample, and the energy required for the blade to move in the powder, that is, the fluidity energy, is measured. The blade is of a propeller type, and when it rotates, it moves in the rotational axis direction simultaneously, and therefore, a free end of the blade moves helically.

The propeller type blade 54 is made of SUS (type=C210) and has a diameter of 48 mm, and is twisted smoothly in the counterclockwise direction. More specifically, from a center of the blade of 48 mm×10 mm, a rotation shaft extends in a normal line direction relative to a rotation plane of the blade, a twist angle of the blade at the opposite outermost edge portions (the positions of 24 mm from the rotation shaft) is 70°, and a twist angle at the positions of 12 mm from the rotation shaft is 35°.

The fluidity energy is total energy provided by integrating with time a total sum of a rotational torque and a vertical load when the helical rotating blade 54 enters the powder layer and advances in the powder layer. The value thus obtained indicates easiness of loosening of the developer powder layer, and large fluidity energy means less easiness and small fluidity energy means greater easiness.

In this measurement, as shown in FIG. 8, the developer T is filled up to a powder surface level of 70 mm (L2 in FIG. 8) into the cylindrical container 53 having a diameter ϕ of 50 mm (volume=200 cc, L1 (FIG. 8)=50 mm) which is the standard part of the device. The filling amount is adjusted in accordance with a bulk density of the developer to measure. The blade 54 of ϕ48 mm which is the standard part is advanced into the powder layer, and the energy required to advance from depth 10 mm to depth 30 mm is displayed.

The set conditions at the time of measurement are,

The rotational speed of the blade 54 (tip speed=peripheral speed of the outermost edge portion of the blade) is 60 mm/s:

The blade advancing speed in the vertical direction into the powder layer is such a speed that an angle θ (helix angle) formed between a track of the outermost edge portion of the blade 54 during advancement and the surface of the powder layer is 10°:

The advancing speed into the powder layer in the perpendicular direction is 11 mm/s (blade advancement speed in the powder layer in the vertical direction=(rotational speed of blade)×tan (helix angle×n/180)): and The measurement is carried out under the condition of temperature of 24° C. and relative humidity of 55%.

The bulk density of the developer when the fluidity energy of the developer is measured is close to that when the experiments for verifying the relation between the discharge amount of the developer and the size of the discharge opening, is less changing and is stable, and more particularly is adjusted to be 0.5 g/cm$^3$.

The verification experiments were carried out for the developers (Table 1) with the measurements of the fluidity energy in such a manner. FIG. 9 is a graph showing relations between the diameters of the discharge openings and the discharge amounts with respect to the respective developers.

From the verification results shown in FIG. 9, it has been confirmed that the discharge amount through the discharge opening is not more than 2 g for each of the developers A-E, if the diameter $\phi$ of the discharge opening is not more than 4 mm (12.6 mm$^2$ in the opening area (circle ratio=3.14)). When the diameter $\phi$ discharge opening exceeds 4 mm, the discharge amount increases sharply.

The diameter $\phi$ of the discharge opening is preferably not more than 4 mm (12.6 mm$^2$ of the opening area) when the fluidity energy of the developer (0.5 g/cm$^3$ of the bulk density) is not less than $4.3 \times 10^{-4}$ kg-m$^2$/s$^2$ (J) and not more than $4.14 \times 10^{-3}$ kg-m$^2$/s$^2$ (J).

As for the bulk density of the developer, the developer has been loosened and fluidized sufficiently in the verification experiments, and therefore, the bulk density is lower than that expected in the normal use condition (left state), that is, the measurements are carried out in the condition in which the developer is more easily discharged than in the normal use condition.

The verification experiments were carries out as to the developer A with which the discharge amount is the largest in the results of FIG. 9, wherein the filling amount in the container were changed in the range of 30-300 g while the diameter $\phi$ of the discharge opening is constant at 4 mm. The verification results are shown in FIG. 10. From the results of FIG. 10, it has been confirmed that the discharge amount through the discharge opening hardly changes even if the filling amount of the developer changes.

From the foregoing, it has been confirmed that by making the diameter $\phi$ of the discharge opening not more than 4 mm (12.6 mm$^2$ in the area), the developer is not discharged sufficiently only by the gravitation through the discharge opening in the state that the discharge opening is directed downwardly (supposed supplying attitude into the developer replenishing apparatus 201) irrespective of the kind of the developer or the bulk density state.

On the other hand, the lower limit value of the size of the discharge opening 4a is preferably such that the developer to be supplied from the developer supply container 1 (one component magnetic toner, one component non-magnetic toner, two component non-magnetic toner or two component magnetic carrier) can at least pass therethrough. More particularly, the discharge opening is preferably larger than a particle size of the developer (volume average particle size in the case of toner, number average particle size in the case of carrier) contained in the developer supply container 1. For example, in the case that the supply developer comprises two component non-magnetic toner and two component magnetic carrier, it is preferable that the discharge opening is larger than a larger particle size, that is, the number average particle size of the two component magnetic carrier.

Specifically, in the case that the supply developer comprises two component non-magnetic toner having a volume average particle size of 5.5 μm and a two component magnetic carrier having a number average particle size of 40 μm, the diameter of the discharge opening 4a is preferably not less than 0.05 mm (0.002 mm$^2$ in the opening area).

If, however, the size of the discharge opening 4a is too close to the particle size of the developer, the energy required for discharging a desired amount from the developer supply container 1, that is, the energy required for operating the pump portion 3a is large. It may be the case that a restriction is imparted to the manufacturing of the developer supply container 1. In order to mold the discharge opening 4a in a resin material part using an injection molding method, a metal mold part for forming the discharge opening 4a is used, and the durability of the metal mold part will be a problem. From the foregoing, the diameter φ of the discharge opening 4a is preferably not less than 0.5 mm.

In this example, the configuration of the discharge opening 4a is circular, but this is not inevitable. A square, a rectangular, an ellipse or a combination of lines and curves or the like are usable if the opening area is not more than 12.6 mm$^2$ which is the opening area corresponding to the diameter of 4 mm.

However, a circular discharge opening has a minimum circumferential edge length among the configurations having the same opening area, the edge being contaminated by the deposition of the developer. Therefore, the amount of the developer dispersing with the opening and closing operation of the shutter 4b is small, and therefore, the contamination is decreased. In addition, with the circular discharge opening, a resistance during discharging is also small, and a discharging property is high. Therefore, the configuration of the discharge opening 4a is preferably circular which is excellent in the balance between the discharge amount and the contamination prevention.

From the foregoing, the size of the discharge opening 4a is preferably such that the developer is not discharged sufficiently only by the gravitation in the state that the discharge opening 4a is directed downwardly (supposed supplying attitude into the developer replenishing apparatus 201). More particularly, a diameter $\phi$ of the discharge opening 4a is not less than 0.05 mm (0.002 mm$^2$ in the opening area) and not more than 4 mm (12.6 mm$^2$ in the opening area). Furthermore, the diameter $\phi$ of the discharge opening 4a is preferably not less than 0.5 mm (0.2 mm$^2$ in the opening area and not more than 4 mm (12.6 mm$^2$ in the opening area). In this example, on the basis of the foregoing investigation, the discharge opening 4a is circular, and the diameter φ of the opening is 2 mm.

In this example, the number of discharge openings 4a is one, but this is not inevitable, and a plurality of discharge openings 4a, if the respective opening areas satisfy the above-described range. For example, in place of one developer receiving port 13 having a diameter φ of 3 mm, two discharge openings 4a each having a diameter φ of 0.7 mm are employed. However, in this case, the discharge amount of the developer per unit time tends to decrease, and therefore, one discharge opening 4a having a diameter φ of 2 mm is preferable.

(Cylindrical Portion)

Referring to FIGS. 6, 7, the cylindrical portion 2k functioning as the developer accommodating chamber will be described.

As soon in FIGS. 6 and 7, an inner surface of the cylindrical portion 2k is provided with a feeding portion 2c which is projected and extended helically, the feeding projection 2c functioning as a feeding portion for feeding the developer accommodated in the developer accommodating portion 2 toward the discharging portion 4c (discharge opening 4a) functioning as the developer discharging chamber, with rotation of the cylindrical portion 2k.

The cylindrical portion 2k is formed by a blow molding method from an above-described resin material.

In order to increase a filling capacity by increasing the volume of the developer supply container 1, it would be considered that the height of the discharging portion 4c as the developer accommodating portion 2 is increased to increase the volume thereof. However, with such a structure, the gravitation to the developer adjacent the discharge opening 4a increases due to the increased weight of the developer. As a result, the developer adjacent the discharge opening 3a tends to be compacted with the result of obstruction to the suction/discharging through the discharge opening 4a. In this case, in order to loosen the developer compacted by the suction through the discharge opening 4a or in order to discharge the developer by the discharging, the volume change of the pump portion 3a has to be increased. As a result, the driving force for driving the pump portion 3a has to be increased, and the load to the main assembly of the image forming apparatus 100 may be increased to an extreme extent.

In this example, the cylindrical portion 2k extends in the horizontal direction from the flange portion 4 so that the amount of the developer is adjusted by the volume of the cylindrical portion 2k, and therefore, the thickness of the developer layer on the discharge opening 4a in the developer supply container 1 can be made small as compared with the above-described high structure. By doing so, the developer does not tend to be compacted by the gravitation, and therefore, the developer can be discharged stably without large load to the main assembly of the image forming apparatus 100.

As shown in part (b) and part (c) of FIG. 7, the cylindrical portion 2k is fixed rotatably relative to the flange portion 4 with a flange seal 5b of a ring-like sealing member provided on the inner surface of the flange portion 4 being compressed.

By this, the cylindrical portion 2k rotates while sliding relative to the flange seal 5b, and therefore, the developer does not leak out during the rotation, and a hermetical property is provided. Thus, the air can be brought in and out through the discharge opening 4a, so that desired states of the volume change of the developer supply container 1 during the developer supply can be accomplished.

(Pump Portion)

Referring to FIG. 7, the description will be made as to the pump portion (reciprocable pump) 2b in which the volume thereof changes with reciprocation. Part (a) of FIG. 7 is a perspective view of a section of the developer supply container, and part (b) of FIG. 7 is a partially sectional view in a state in which the pump portion is expanded to the maximum usable limit, and (c) is a partially sectional view in a state in which the pump portion is contracted to the maximum usable limit.

The pump portion 3a of this example functions as a suction and discharging mechanism for repeating the sucking operation and the discharging operation alternately through the discharge opening 3a. In other words, the pump portion 3a functions as an air flow generating mechanism for generating repeatedly and alternately air flow into the developer supply container and air flow out of the developer supply container through the discharge opening 4a.

As shown in part (b) of FIG. 7, the pump portion 3a is provided at a position away from the discharging portion 4c in a direction X. Thus, the pump portion 3a does not rotate in the rotational direction of the cylindrical portion 2k together with the discharging portion 4c.

The pump portion 3a of this example is capable of accommodating the developer therein. The developer accommodating space of the pump portion 3a plays an important function for the fluidization of the developer in the suction operation, as will be described hereinafter.

In this example, the pump portion 3a is a displacement type pump (bellow-like pump) of resin material in which the volume thereof changes with the reciprocation. More particularly, as shown in parts (a)-(c) of FIG. 7, the bellow-like pump includes crests and bottoms periodically and alternately. The pump portion 2b repeats the compression and the expansion alternately by the driving force received from the developer replenishing apparatus 201. In this example, the volume change by the expansion and contraction is 5 cm^3 (cc). The length L3 (part (b) of FIG. 7) is approx. 29 mm, the length L4 (part (c) of FIG. 7) is approx. 24 mm. The outer diameter R2 of the pump portion 3a is approx. 45 mm.

Using the pump portion 3a of such a structure, the volume of the developer supply container 1 can be alternately changed repeatedly at predetermined intervals.

As a result, the developer in the discharging portion 4c can be discharged efficiently through the small diameter discharge opening 4a (diameter of approx. 2 mm).

(Drive Receiving Mechanism)

The description will be made as to a drive receiving mechanism (drive receiving portion, driving force receiving portion) of the developer supply container 1 for receiving the rotational force for rotating the cylindrical portion 2k provided with feeding projection 2c from the developer replenishing apparatus 201.

As shown in part (a) of FIG. 6, the developer supply container 1 is provided with a gear portion 2a which functions as a drive receiving mechanism (drive receiving portion, driving force receiving portion) engageable (driving connection) with a driving gear 300 (functioning as driving mechanism) of the developer replenishing apparatus 201. The gear portion 2d and the cylindrical portion 2k are integrally rotatable.

Therefore, the rotational force inputted to the gear portion 2d from the driving gear 300 is transmitted to the pump portion 3a through a reciprocation member 3b shown in part (a) and (b) of FIG. 11, as will be described in detail hereinafter.

The bellow-like pump portion 3a of this example is made of a resin material having a high property against torsion or twisting about the axis within a limit of not adversely affecting the expanding-and-contracting operation.

In this example, the gear portion 2d is provided at one longitudinal end (developer feeding direction) of the cylindrical portion 2k, but this is not inevitable, and the gear portion 2a may be provided at the other longitudinal end side of the developer accommodating portion 2, that is, the trailing end portion. In such a case, the driving gear 300 is provided at a corresponding position.

In this example, a gear mechanism is employed as the driving connection mechanism between the drive receiving portion of the developer supply container 1 and the driver of the developer replenishing apparatus 201, but this is not inevitable, and a known coupling mechanism, for example is usable. More particularly, in such a case, the structure may be such that a non-circular recess is provided as a drive receiving portion, and correspondingly, a projection having a configuration corresponding to the recess as a driver for the developer replenishing apparatus 201, so that they are in driving connection with each other.

(Drive Converting Mechanism)

A drive converting mechanism (drive converting portion) for the developer supply container 1 will be described. In this example, a cam mechanism is taken as an example of the drive converting mechanism.

The developer supply container 1 is provided with the cam mechanism which functions as the drive converting mechanism (drive converting portion) for converting the rotational force for rotating the cylindrical portion 2k received by the gear portion 2d to a force in the reciprocating directions of the pump portion 3a.

In this example, one drive receiving portion (gear portion 2d) receives the driving force for rotating the cylindrical portion 2k and for reciprocating the pump portion 3a, and the rotational force received by converting the rotational driving force received by the gear portion 2d to a reciprocation force in the developer supply container 1 side.

Because of this structure, the structure of the drive receiving mechanism for the developer supply container 1 is simplified as compared with the case of providing the developer supply container 1 with two separate drive receiving portions. In addition, the drive is received by a single driving gear of developer replenishing apparatus 201, and therefore, the driving mechanism of the developer replenishing apparatus 201 is also simplified.

Part (a) of FIG. 11 is a partial view in a state in which the pump portion is expanded to the maximum usable limit, (b) is a partial view in a state in which the pump portion is contracted to the maximum usable limit, and (c) is a partial view of the pump portion. As shown in part (a) of FIG. 11 and part (b) of FIG. 11, the used member for converting the rotational force to the reciprocation force for the pump portion 3a is the reciprocation member 3b. More specifically, it includes a rotatable cam groove 2e extended on the entire circumference of the portion integral with the driven receiving portion (gear portion 2d) for receiving the rotation from the driving gear 300. The cam groove 2e will be described hereinafter. The cam groove 2e is engaged with an reciprocation member engaging projection projected from the reciprocation member 3b. In this example, as shown in part (c) of FIG. 11, the reciprocation member 3b is limited in the movement in the rotational moving direction of the cylindrical portion 2k by a protecting member rotation regulating portion 3f (play will be permitted) so that the reciprocation member 3b does not rotate in the rotational direction of the cylindrical portion 2k. By the movement in the rotational moving direction limited in this manner, it reciprocates along the groove of the cam groove 2e (in the direction of the arrow X shown in FIG. 7 or the opposite direction). A plurality of such reciprocation member engaging projections 3c are provided and are engaged with the cam groove 2e. More particularly, two reciprocation member engaging projections 3c are provided opposed to each other in the diametrical direction of the cylindrical portion 2k (approx. 180° opposing).

The number of the reciprocation member engaging projections 3c is satisfactory if it is not less than one. However, in consideration of the liability that a moment is produced by the drag force during the expansion and contraction of the pump portion 3a with the result of unsmooth reciprocation, the number is preferably plural as long as the proper relation is assured in relation to the configuration of the cam groove 2e which will be described hereinafter.

In this manner, by the rotation of the cam groove 2e by the rotational force received from the driving gear 300, the reciprocation member engaging projection 3c reciprocates in the arrow X direction and the opposite direction along the cam groove 2e, by which the pump portion 3a repeats the expanded state (part (a) of FIG. 11) and the contracted state (part (b) of FIG. 11) alternately, thus changing the volume of the developer supply container 1.

(Set Conditions of Drive Converting Mechanism)

In this example, the drive converting mechanism effects the drive conversion such that an amount (per unit time) of developer feeding to the discharging portion 4c by the rotation of the cylindrical portion 2k is larger than a discharging amount (per unit time) to the developer replenishing apparatus 201 from the discharging portion 4c by the function of the pump portion.

This is because if the developer discharging power of the pump portion 2b is higher than the developer feeding power of the feeding projection 2c to the discharging portion 3h, the amount of the developer existing in the discharging portion 3h gradually decreases. In other words, it is avoided that the time period required for supplying the developer from the developer supply container 1 to the developer replenishing apparatus 201 is prolonged.

In addition, in the drive converting mechanism of this example, the drive conversion is such that the pump portion 3a reciprocates a plurality of times per one full rotation of the cylindrical portion 2k. This is for the following reasons.

In the case of the structure in which the cylindrical portion 2k is rotated inner the developer replenishing apparatus 201, it is preferable that the driving motor 500 is set at an output required to rotate the cylindrical portion 2k stably at all times. However, from the standpoint of reducing the energy consumption in the image forming apparatus 100 as much as possible, it is preferable to minimize the output of the driving motor 500. The output required by the driving motor 500 is calculated from the rotational torque and the rotational frequency of the cylindrical portion 2k, and therefore, in order to reduce the output of the driving motor 500, the rotational frequency of the cylindrical portion 2k is minimized.

However, in the case of this example, if the rotational frequency of the cylindrical portion 2k is reduced, a number of operations of the pump portion 3a per unit time decreases, and therefore, the amount of the developer (per unit time) discharged from the developer supply container 1 decreases. In other words, there is a possibility that the developer amount discharged from the developer supply container 1 is insufficient to quickly meet the developer supply amount required by the main assembly of the image forming apparatus 100.

If the amount of the volume change of the pump portion 3a is increased, the developer discharging amount per unit cyclic period of the pump portion 3a can be increased, and therefore, the requirement of the main assembly of the image forming apparatus 100 can be met, but doing so gives rise to the following problem.

If the amount of the volume change of the pump portion 2b is increased, a peak value of the internal pressure (positive pressure) of the developer supply container 1 in the discharging step increases, and therefore, the load required for the reciprocation of the pump portion 2b increases.

For this reason, in this example, the pump portion 3a operates a plurality of cyclic periods per one full rotation of the cylindrical portion 2k. By this, the developer discharge amount per unit time can be increased as compared with the case in which the pump portion 3a operates one cyclic period per one full rotation of the cylindrical portion 2k, without increasing the volume change amount of the pump portion 3a. Corresponding to the increase of the discharge amount of the developer, the rotational frequency of the cylindrical portion 2k can be reduced.

With the structure of this example, the required output of the driving motor 500 may be low, and therefore, the energy consumption of the main assembly of the image forming apparatus 100 can be reduced.

(Position of Drive Converting Mechanism)

As shown in FIG. 11, in this example, the drive converting mechanism (cam mechanism constituted by the reciprocation member engaging projection 3c and cam groove 2e) is provided outside of developer accommodating portion 2. More particularly, the drive converting mechanism is disposed at a position separated from the inside spaces of the cylindrical portion 2k, the pump portion 3a and the discharging portion 4c, so that the drive converting mechanism does not contact the developer accommodated inside the cylindrical portion 2k, the pump portion 3 and the discharging portion 4.

By this, a problem which may arise when the drive converting mechanism is provided in the inside space of the developer accommodating portion 2 can be avoided. More particularly, the problem is that by the developer entering portions of the drive converting mechanism where sliding motions occur, the particles of the developer are subjected to heat and pressure to soften and therefore, they agglomerate into masses (coarse particle), or they enter into a converting mechanism with the result of torque increase. The problem can be avoided.

Now, the description will be made as to the developer supplying step into the developer supplying apparatus 201 by the developer supply container 1.

(Developer Supplying Step)

Referring to FIGS. 11 and 12, a developer supplying step by the pump portion 3a will be described. Part (a) of FIG. 11 is a partial view in a state in which the pump portion is expanded to the maximum usable limit, (b) is a partial view in a state in which the pump portion is contracted to the maximum usable limit, and (c) is a partial view of the pump portion. FIG. 12 is a extended elevation illustrating a cam groove 21, in the above-described drive converting mechanism (cam mechanism including the reciprocating member engaging projection 3c and the cam groove 2e.

In this example, as will be described hereinafter, the drive conversion of the rotational force is carries out by the drive converting mechanism so that the suction step by the pump operation (suction operation through discharge opening 4a), the discharging step (discharging operation through the discharge opening 4a) and the rest step by the non-operation of the pump portion (neither suction nor discharging is effected through the discharge opening 4a) are repeated alternately. The suction step, the discharging step and the rest step will be described.

(Suction Step)

First, the suction step (suction operation through discharge opening 4a) will be described.

As shown in FIG. 11, the suction operation is effected by the pump portion 3a being changed from the most contracted state (part (b) of FIG. 11) to the most expanded state (part (a) of FIG. 11) by the above-described drive converting mechanism (cam mechanism). More particularly, by the suction operation, a volume of a portion of the developer supply container 1 (pump portion 3a, cylindrical portion 2k and discharging portion 4c) which can accommodate the developer increases.

At this time, the developer supply container 1 is substantially hermetically sealed except for the discharge opening 4a, and the discharge opening 3a is plugged substantially by the developer T. Therefore, the internal pressure of the developer supply container 1 decreases with the increase of the volume of the portion of the developer supply container 1 capable of containing the developer T.

At this time, the internal pressure of the developer supply container 1 is lower than the ambient pressure (external air pressure). For this reason, the air outside the developer supply container 1 enters the developer supply container 1 through the discharge opening 4a by a pressure difference between the inside and the outside of the developer supply container 1.

At this time, the air is taken-in from the outside of the developer supply container 1, and therefore, the developer T in the neighborhood of the discharge opening 4a can be loosened (fluidized). More particularly, the air impregnated into the developer powder existing in the neighborhood of the discharge opening 4a, thus reducing the bulk density of the developer powder T and fluidizing.

Since the air is taken into the developer supply container 1 through the discharge opening 4a, the internal pressure of the developer supply container 1 changes in the neighborhood of the ambient pressure (external air pressure) despite the increase of the volume of the developer supply container 1.

In this manner, by the fluidization of the developer T, the developer T does not pack or clog in the discharge opening 4a, so that the developer can be smoothly discharged through the discharge opening 4a in the discharging operation which will be described hereinafter. Therefore, the amount of the developer T (per unit time) discharged through the discharge opening 4a can be maintained substantially at a constant level for a long term.

For effecting the sucking operation, it is not inevitable that the pump portion 3a changes from the most contracted state to the most expanded state, but the sucking operation is effected if the internal pressure of the developer supply container 1 changes even if the pump portion changes from the most contracted state halfway to the most expanded state. That is, the suction stroke corresponds to the state in which the reciprocation member engaging projection 3c is engaged with the cam groove (second operation portion) 2h shown in FIG. 12.

(Discharging Stroke)

The discharging step (discharging operation through the discharge opening 4a) will be described.

As shown in part (b) of FIG. 12, the discharging operation is effected by the pump portion 3a being changed from the most expanded state to the most contracted state. More particularly, by the discharging operation, a volume of a portion of the developer supply container 1 (pump portion 3a, cylindrical portion 2k and discharging portion 4c) which can accommodate the developer decreases. At this time, the developer supply container 1 is substantially hermetically sealed except for the discharge opening 4a, and the discharge opening 4a is plugged substantially by the developer T until the developer is discharged. Therefore, the internal pressure of the developer supply container 1 rises with the decrease of the volume of the portion of the developer supply container 1 capable of containing the developer T.

The internal pressure of the developer supply container 1 is higher than the ambient pressure (the external air pressure). Therefore, the developer T is pushed out by the pressure difference between the inside and the outside of the developer supply container 1. That is, the developer T is discharged from the developer supply container 1 into the developer replenishing apparatus 201.

Also air in the developer supply container 1 is also discharged with the developer T, and therefore, the internal pressure of the developer supply container 1 decreases.

As described in the foregoing, according to this example, the discharging of the developer can be effected efficiently using one reciprocation type pump portion 3a, and therefore, the mechanism for the developer discharging can be simplified.

For effecting the discharging operation, it is not inevitable that the pump portion 3a changes from the most expanded state to the most contracted state, but the discharging operation is effected if the internal pressure of the developer supply container 1 changes even if the pump portion changes from the most expanded state halfway to the most contracted state. That is, the discharging stroke corresponds to the state in which the reciprocation member engaging projection 3c is engaged with the cam groove 2 g shown in FIG. 12.

(Rest Stroke)

The rest stroke in which the pump portion 3a does not to reciprocate will be described.

In this example, as described hereinbefore, the operation of the driving motor 500 is controlled by the control device 600 on the basis of the results of the detection of the magnetometric sensor 800c and/or the developer sensor 10d. With such a structure, the amount of the developer discharged from the developer supply container 1 directly influences the toner content of the developer, and therefore, it is necessary to supply the amount of the developer required by the image forming apparatus from the developer supply container 1. At this time, in order to stabilize the amount of the developer discharged from the developer supply container 1, it is desirable that the amount of volume change at one time is constant.

If, for example, the cam groove 2e includes only the portions for the discharging stroke and the suction stroke, the motor actuation may stop at halfway of the discharging stroke or suction stroke. After the stop of the driving motor 500, the cylindrical portion 2k continues rotating by the inertia, by which the pump portion 3a continues reciprocating until the cylindrical portion 2k stops, during which the discharging stroke or the suction stroke continues. The distance through which the cylindrical portion 2k rotates by the inertia is dependent on the rotational speed of the cylindrical portion 2k. Further, the rotational speed of the cylindrical portion 2k is dependent on the torque applied to the driving motor 500. From this, the torque to the motor changes depending on the amount of the developer in the developer supply container 1, and the speed of the cylindrical portion 2k may also change, and therefore, it is difficult to stop the pump portion 3a at the same position.

In order to stop the pump portion 3a at the same position, a region in which the pump portion 3a does not reciprocate even during the rotation of the cylindrical portion 2k is required to be provided in the cam groove 2e. In this embodiment, for the purpose of preventing the reciprocation of the pump portion 3a, there is provided a cam groove 2i (FIG. 12). The cam groove 2i extends in the rotational moving direction of the cylindrical portion 2k, and therefore, the reciprocation member 3b does not move despite the rotation (straight shape). That is, the rest stroke corresponds to the reciprocation member engaging projection 3c engaging with the cam groove 2i.

The non-reciprocation of the pump portion 3a means that the developer is not discharged through the discharge opening 4a (except for the developer falling through the discharge opening 4a due to the vibration or the like during the rotation of the cylindrical portion 2k). Thus, if the discharging stroke or suction stroke through the discharge opening 4a is not effected, the cam groove 2i may be inclined relative to the rotational moving direction toward the rotation axial direction. When the cam groove 2i is inclined, the reciprocation of the pump portion 3a corresponding to the inclination is permitted.

(Change of Internal Pressure of Developer Supply Container)

Verification experiments were carried out as to a change of the internal pressure of the developer supply container 1. The verification experiments will be described.

The developer is filled such that the developer accommodating space in the developer supply container 1 is filled with the developer; and the change of the internal pressure of the developer supply container 1 is measured when the pump portion 3a is expanded and contracted in a range of 5 $cm^3$ of volume change. The internal pressure of the developer supply container 1 is measured using a pressure gauge (AP-C40 available from Kabushiki Kaisha KEYENCE) connected with the developer supply container 1.

FIG. 13 shows a pressure change when the pump portion 3a is expanded and contracted in the state that the shutter 4b of the developer supply container 1 filled with the developer is open, and therefore, in the communicatable state with the outside air.

In FIG. 13, the abscissa represents the time, and the ordinate represents a relative pressure in the developer supply container 1 relative to the ambient pressure (reference (1 kPa) (+ is a positive pressure side, and − is a negative pressure side).

When the internal pressure of the developer supply container 1 becomes negative relative to the outside ambient pressure by the increase of the volume of the developer supply container 1, the air is taken in through the discharge opening 4a by the pressure difference. When the internal pressure of the developer supply container 1 becomes positive relative to the outside ambient pressure by the decrease of the volume of the developer supply container 1, a pressure is imparted to the inside developer. At this time, the inside pressure eases corresponding to the discharged developer and air.

By the verification experiments, it has been confirmed that by the increase of the volume of the developer supply container 1, the internal pressure of, the developer supply container 1 becomes negative relative to the outside ambient pressure, and the air is taken in by the pressure difference. In addition, it has been confirmed that by the decrease of the volume of the developer supply container 1, the internal pressure of the developer supply container 1 becomes positive relative to the outside ambient pressure, and the pressure is imparted to the inside developer so that the developer is discharged. In the verification experiments, an absolute value of the negative pressure is approx. 1.2 kPa, and an absolute value of the positive pressure is approx. 0.5 kPa.

As described in the foregoing, with the structure of the developer supply container 1 of this example, the internal pressure of the developer supply container 1 switches between the negative pressure and the positive pressure alternately by the suction operation and the discharging operation of the pump portion 3a, and the discharging of the developer is carried out properly.

As described in the foregoing, the example, a simple and easy pump portion capable of effecting the suction operation and the discharging operation of the developer supply container 1 is provided, by which the discharging of the developer by the air can be carries out stably while providing the developer loosening effect by the air.

In other words, with the structure of the example, even when the size of the discharge opening 4a is extremely small, a high discharging performance can be assured without imparting great stress to the developer since the developer can be passed through the discharge opening 4a in the state that the bulk density is small because of the fluidization.

In addition, in this example, the inside of the displacement type pump portion 3a is utilized as a developer accommodating space, and therefore, when the internal pressure is reduced by increasing the volume of the pump portion 3a, a additional developer accommodating space can be formed. Therefore, even when the inside of the pump portion 3a is filled with the developer, the bulk density can be decreased (the developer can be fluidized) by impregnating the air in the developer powder. Therefore, the developer can be filled in the developer supply container 1 with a higher density than in the conventional art.

(Modified Examples of Set Condition of Cam Groove)

Referring to FIG. 12, modified examples of the set condition of the cam groove 2e constituting the drive converting portion will be described. Referring to the developed view of the drive converting mechanism portion of FIG. 12, the description will be made as to the influence to the operational condition of the pump portion 3a when the configuration of the cam groove 3e is changed.

Here, in FIG. 12, an arrow A indicates a rotational moving direction of the cylindrical portion 2k (moving direction of the cam groove 2e); an arrow B indicates the expansion direction of the pump portion 3a; and an arrow C indicates a compression direction of the pump portion 3a.

In addition, the cam groove 2e includes the cam groove 2g used when the pump portion 3a is compressed, the cam groove 2h used when the pump portion 3a is expanded, and the cam groove (pump rest portion) 2i not reciprocating the pump portion 3a.

Furthermore, a angle formed between the cam groove 3g and the rotational moving direction An of the cylindrical portion 2k is $\alpha$; a angle formed between the cam groove 2h and the rotational moving direction An is $\beta$; and a amplitude (expansion and contraction length of the pump portion 3a), in the expansion and contracting directions B, C of the pump portion 2b, of the cam groove is K1 as described above.

First, the description will be made as to the expansion and contraction length K1 of the pump portion 2b.

When the expansion and contraction length K1 is shortened, the volume change amount of the pump portion 3a decreases, and therefore, the pressure difference from the external air pressure is reduced. Then, the pressure imparted to the developer in the developer supply container 1 decreases, with the result that the amount of the developer discharged from the developer supply container 1 per one cyclic period (one reciprocation, that is, one expansion and contracting operation of the pump portion 3a) decreases.

From this consideration, as shown in FIG. 14, the amount of the developer discharged when the pump portion 3a is reciprocated once, can be decreased as compared with the structure of FIG. 12, if an amplitude K2 is selected so as to satisfy K2<K1 under the condition that the angles $\alpha$ and $\beta$ are constant. On the contrary, if K2>K1, the developer discharge amount can be increased.

As regards the angles $\alpha$ and $\beta$ of the cam groove, when the angles are increased, for example, the movement distance of the reciprocation member engaging projection 3c when the developer accommodating portion 2 rotates for a constant time increases if the rotational speed of the cylindrical portion 2k is constant, and therefore, as a result, the expansion-and-contraction speed of the pump portion 3a increases.

On the other hand, when the reciprocation engaging projection 3c moves in the cam grooves 2g and 2h, the resistance received from the cam grooves 2g and 2h is large, and therefore, a torque required for rotating the cylindrical portion 2k increases as a result.

For this reason, as shown in FIG. 15, if the angle $\alpha'$ of the cam groove 2g and the angle $\beta'$ of the cam groove 2h are selected so as to satisfy $\alpha'>\alpha$ and $\beta'>\beta$ without changing the expansion and contraction length K1, the expansion-and-contraction speed of the pump portion 3a can be increased as compared with the structure of the FIG. 12. As a result, the number of expansion and contracting operations of the pump portion 3a per one rotation of the cylindrical portion 2k can be increased. Furthermore, since a flow speed of the air entering the developer supply container 1 through the discharge opening 4a increases, the loosening effect to the developer existing in the neighborhood of the discharge opening 4a is enhanced.

On the contrary, if the selection satisfies $\alpha'<\alpha$ and $\beta'<\beta$, the rotational torque of the cylindrical portion 2k can be decreased. When a developer having a high flowability is used, for example, the expansion of the pump portion 3a tends to cause the air entered through the discharge opening 4a to blow out the developer existing in the neighborhood of the discharge opening 4a. As a result, there is a possibility that the developer cannot be accumulated sufficiently in the discharging portion 4c, and therefore, the developer discharge amount decreases. In this case, by decreasing the expanding speed of the pump portion 3a in accordance with this selection, the blowing-out of the developer can be suppressed, and therefore, the discharging power can be improved.

If, as shown in FIG. 16, the angle of the cam groove 2e is selected so as to satisfy $\alpha<\beta$, the expanding speed of the pump portion 3a can be increased as compared with a compressing speed. On the contrary, if the angle $\alpha$>the angle $\beta$, the expanding speed of the pump portion 3a can be reduced as compared with the compressing speed.

By doing so, when the developer is in a highly packed state, for example, the operation force of the pump portion 3a is larger in a compression stroke of the pump portion 3a than in a expansion stroke thereof, with the result that the rotational torque for the cylindrical portion 2k tends to be higher in the compression stroke of the pump portion 3a. However, in this case, if the cam groove 2e is constructed as shown in FIG. 16, the developer loosening effect in the expansion stroke of the pump portion 3a can be enhanced as compared with the structure of FIG. 12. In addition, the resistance received by the reciprocation member engaging projection 3c from the cam groove 2e in the compression stroke of the pump portion 3a is small, and therefore, the increase of the rotational torque in the compression of the pump portion 3a can be suppressed.

As shown in FIG. 17, the cam groove 2e may be provided so that the reciprocation member engaging projection 3c passes the cam groove 2g immediately after passing the cam groove 2h. In such a case, immediately after the sucking operation of the pump portion 3a, the discharging operation, starts. The stroke of operation stop in the state of the pump portion 3a expanding, as shown in FIG. 12 is omitted, and therefore, the pressure reduced state in the developer supply container 1 is not kept during the omitted stopping operation, and therefore, the loosening effect of the developer is decreased. However, the omission of the stopping step increases the discharged amount of the developer T, because the suction and discharging strokes are effected more during one rotation of the cylindrical portion 2k.

As shown in FIG. 18, the operation rest stroke (cam groove 2i) may be provided halfway in the discharging stroke and the suction stroke other than the most contracted the state of the pump portion 3a and the most expanded state of the pump portion 3a. By doing so, necessary volume change amount can be selected, and the pressure in the developer supply container 1 can be adjusted.

By changing the configuration of the cam groove 2e as shown in FIGS. 12, 14-18, the discharging power of the developer supply container 1 can be ejected, and therefore, the device of this embodiment can meet the developer amount required by the developer supplying apparatus 201 and/or the property of the used developer or the like.

As described in the foregoing, in this example, the driving force for rotating the cylindrical portion 2k provided with the feeding projection (helical projection 2c) and the driving force for reciprocating the pump portion 3a are received by a single drive receiving portion (gear portion 2d). Therefore, the structure of the drive inputting mechanism of the developer supply container can be simplified. In addition, by the single driving mechanism (driving gear 300) provided in the developer replenishing apparatus, the driving force is applied to the developer supply container, and therefore, the driving mechanism for the developer replenishing apparatus can be simplified.

With the structure of the example, the rotational force for rotating the cylindrical portion 2k received from the developer replenishing apparatus is converted by the drive converting mechanism of the developer supply container, by which the pump portion can be reciprocated properly.

(Regulating Portion)

Referring to FIGS. 7 and 19-23, the regulating portion 7 which is most charactristical structure of the present invention will be described specifically. Part (a) of FIG. 7 is a perspective view of a section of the developer supply container, part (b) of FIG. 7 is a partially sectional view when the pump is expanded to the maximum, and part (c) of FIG. 7 is a partially sectional view in the state that the pump portion is contracted to the maximum extend in use. Part (a) of FIG. 19 is a perspective view of an entirety of a feeding member 6 provided in the container of Embodiment 1, part (b) of FIG. 19 is a side view of the feeding member 6, FIGS. 20-23 are sectional views as seen from the pump portion 3a side of FIG. 7 illustrating the inside of the container during the supplying operation.

As shown in part (a) of FIG. 7, the regulating portion 7 is provided integrally with a pump portion 3a side end portion of the feeding member 6. Therefore, with the rotating operation of the feeding member 6 rotating integrally with the cylindrical portion 2k, the regulating portion 7 also rotates.

As shown in FIG. 19, the regulating portion 7 includes two thrust prevention walls 7a and 7b extending in parallel with each other at a position width S away from each other in the rotational axial direction (arrow X in part (b) of FIG. 7) and two radial prevention walls 7c and 7d. In addition, there is provided an accommodating portion opening 7e for permitting communication between a space in the developer accommodating portion 2 and a space in the regulating portion 7, adjacent to a rotational axis center of the thrust prevention wall 7a provided in the pump portion 3a side. In this embodiment, the accommodating portion opening 7e is formed in the pump portion side surface of the regulating portion 7. In addition, a fluid communication path opening 7f capable of communicating with the fluid communication path 4d is defined by two thrust prevention walls 7a and 7b and two radial prevention walls 7c and 7d, at an outside end position away from the rotational axis center. That is, the position of the communicating portion opening 7f with respect to the rotational axis thrust direction is such that the communicating portion opening 7f overlaps at least partly with the fluid communication path 4d. Inside the regulating portion 7 sounded by two thrust prevention walls 7a and 7b and two radial prevention walls 7c and 7d, an air flow path 7g communicatable with the accommodating portion opening 7e and the communicating portion opening 7f is defined. In this embodiment, the regulating portion 7 overlays the communicating portion 4d with respect to the rotational axial direction.

Referring to FIGS. 20-23, the operation of the regulating portion 7 during the developer supplying step will be described. FIG. 20 is a sectional view of a discharging portion of the pump portion in the operation rest stroke, in Embodiment 1 FIG. 21 is a sectional view of the discharging portion in the suction operation in Embodiment 1 FIG. 22 is a sectional view of the discharging portion in the discharging operation in Embodiment 1 FIG. 23 is a sectional view of the discharging portion after the developer is discharged, in Embodiment 1

In FIG. 20, with the rotation of the cylindrical portion 2k of the developer supply container 1, the pump portion 3a is in the operation rest stroke.

At this time, the regulating portion 7 rotates with the rotation of the feeding member 6, so that the storage portion opening 7f of the regulating portion 7 does not overlay the upper portion of the fluid communication path 4d provided at the bottom of the discharging portion 4c. In addition, because the pump portion 3a is in the operation rest stroke, and therefore, does not reciprocate, so that the internal pressure of the developer accommodating portion 2 does not change. Here, in this embodiment, the feeding member 6 functions as a movable portion to move the regulating portion 7 to above (entrance region) the opening of the fluid communication path 4d and to move to retract from the entrance region.

As a result, the regulating portion 7 does not act on the fluid communication path 4d, so that the developer T fed to the neighborhood of the upper portion of the fluid communication path 4d by the feeding member 6 flows into the fluid communication path 4d and is stored (developer entering non-regulation state).

By rotation of the feeding member 6 from the developer entering non-regulation state, the position shown in FIG. 21 is reached.

In FIG. 21, the pump portion 3a is in the suction stroke in which a pump portion 3a is halfway from the most contracted state to the most expanded the state.

At this time, the regulating portion 7 rotates with the rotation of the feeding member 6, so that the upper portion of the fluid communication path 4d becomes partly overlaid with the fluid communication path opening 7f of the regulating portion 7 from the state in which the fluid communication path 4d is not overlaid with the fluid communication path opening 7f of the regulating portion 7, In addition, because the pump portion 3a is in the suction stroke, the expansion of the pump portion 3a provides a reduced pressure in the developer accommodating portion 2, by which the air moves into the developer supply container 1 through the discharge opening 4a from the outside of the developer supply container 1 due to the pressure difference between the inside and the outside of the developer supply container 1.

As a result, the developer powder T stored in the fluid communication path 4d in the previous stroke takes the air therein through the discharge opening 4a, so that the bulk density of the developer powder lowers and the developer is fluidized.

In the portion above the fluid communication path 4d, the fluid communication path opening 7f of the regulating portion 7 overlays the upper portion of the fluid communication path 4d, by which the downstream side radial prevention wall 7c (with respect to rotational moving direction of the regulating portion 7) pushes away the developer T above the fluid communication path 4d, with the rotation of the regulating portion 7. Furthermore, the fluid communication path opening 7f of the regulating portion 7 partly overlays the upper portion of the fluid communication path 4d. As a result, the flow of the developer T adjacent the upper portion of the fluid communication path 4d into the fluid communication path 4d is limited (developer flow limited state) by the thrust prevention walls 7a, 7b and the radial prevention walls 7c, 7d of the regulating portion 7.

By the further rotation of the feeding member 6 from the developer flow limited state, the state becomes as shown in FIG. 22.

FIG. 22 shows the discharging stroke, that is, halfway from the most expanded state of the pump portion 3a to the most contracted state thereof.

At this time, the regulating portion 7 rotates with the rotation of the feeding member 6, and at least a part of the fluid communication path opening 7f always overlays the upper portion of the fluid communication path 4d. In addition, because the pump portion 3a is in the discharging stroke, the contraction of the pump portion 3a provides a pressure higher than the ambient pressure in the developer supply container 1, so that the air moves from the developer supply container 1 to the outside of the developer supply container 1 through the discharge opening 4a by the pressure difference between the inside and the outside of the developer supply container 1.

As a result, the developer T in the fluid communication path 4d fluidized by the previous suction stroke is discharged into the developer supplying apparatus 201 through the discharge opening 4a.

Also in the discharging stroke, similarly to the above-described suction stroke, the state in the upper portion of the fluid communication path 4d is such that the downstream side radial prevention wall 7c (with respect to rotational moving direction of the regulating portion 7) pushes away the toner above the fluid communication path 4d with the rotation of the regulating portion 7. Furthermore, a part of the fluid communication path opening 7f of the regulating portion 7 always overlays the upper portion of the fluid communication path 4d. As a result, in the discharging stroke, the flow of the developer T in the nationhood of the upper portion of the fluid communication path 4d into the fluid communication path 4d is limited by the thrust prevention walls 7a, 7b and the radial prevention walls 7c, 7d of the regulating portion 7 (developer flow limited state).

Here, the specific description will be made as to the air flow in the developer supply container 1, which air flow acts on the developer T in the fluid communication path 4d in the discharging stroke. With the above-described structure, the air flow for the fluid communication path 4d in the discharging stroke is two ways, as will be described below.

In one of them, the air flows from the inside of the pump portion or the developer accommodating portion 2 through the accommodating portion opening 7e provided in the neighborhood of the rotational axis center of the regulating portion 7, the air flow path 7g inside the regulating portion 7, and the fluid communication path opening 7f of the regulating portion 7 in fluid communication with the fluid communication path 4d, thereby acting on the developer T in the fluid communication path 4d. In the other way, the air flows through a gap between the upper portion of the fluid communication path 4d and the regulating portion 7 overlaying the upper portion of the fluid communication path 4d, thereby acting on the developer T in the fluid communication path 4d.

However, the main one of the air flows into the fluid communication path 4d in the discharging stroke is the former one, for the following reason.

In the discharging stroke, the flow of the developer T in the neighborhood of the outer periphery of the fluid communication path opening 7f of the regulating portion 7 covering the upper portion of the fluid communication path 4d is limited in the flow into the fluid communication path 4d by the thrust prevention walls 7a, 7b and the radial prevention walls 7c, 7d of the regulating portion 7. Therefore, in the neighborhood of the outer periphery of the fluid communication path opening 7f of the regulating portion 7, the developer T stagnates, and for this reason, the stagnating developer T functions as a resistance against the airflow toward the fluid communication path 4d. On the contrary, the neighborhood of the accommodating portion opening 7e provided in the neighborhood of the rotational axis of the regulating portion 7, is at an upper level in the vertical direction than the fluid communication path opening 7f in the discharging stroke, and therefore, the amount of the stagnated developer T is small than in the fluid communication path opening 7f, and the resistance against the air flow is smaller. As a result, the main air flow in the discharging stroke is that through the air flow path 7g in the regulating portion 7 (former way) where the resistance against the air flow by the developer T is relatively smaller.

As a result, in the discharging stroke, the developer T in the fluid communication path 4d communicatable with the air flow path 7g is discharged by and together with the air having passed through the air flow path 7g in the regulating portion 7, into the developer supplying apparatus 201. As described in the foregoing, in the discharging stroke, the flow of the developer T into the fluid communication path 4d is always limited by the regulating portion 7 (developer flow limited state), and therefore, a substantially constant amount of the developer is contained in the fluid communication path 4d.

Furthermore, the internal pressure in the developer supply container 1 in the discharging stroke finally becomes equivalent to the pressure outside the developer supply container 1, because the inside and outside spaces of the developer supply container 1 are brought into communication with each other at the time when the developer T in the fluid communication path 4d is discharged (FIG. 23) with the flow of the air, and thereafter, only the air is discharged. That is, after the discharge of the developer T in the fluid communication path 4d, only the air is discharged by the pressure difference between the inside and outside of the developer supply container 1, and no developer is discharged. Therefore, by the discharging stroke, only the constant amount of the developer T stored in the fluid communication path 4d is discharged, and for this reason, the developer T can be discharged into the developer supplying apparatus 201 with very high supply accuracy.

In the discharging stroke, it is preferable that the fluid communication path opening 7f of the regulating portion 7 is completely overlay the upper portion of the fluid communication path 4d without gap. This is because then the flow of the developer T into the fluid communication path 4d from the neighborhood above the fluid communication path 4*d* does not occur, so that the supply accuracy is further stable.

Here, referring to FIG. 24, a comparison example will be described in which no regulating portion 7 is provided. As compared with the above-described embodiment, the structure of FIG. 24 is different in that only the regulating portion 7 is omitted, and the other structures are similar to those of the embodiment.

As shown in FIG. 24, with this structure of the comparison example, no regulating portion 7 is provided above the fluid communication path 4*d*, and therefore, the upper portion of the fluid communication path 4*d* is always open, so that the developer T flowing into the fluid communication path 4*d* is not controlled in the flow into the fluid communication path 4*d*. Therefore, in addition to the constant amount of the developer T stored in the fluid communication path 4*d*, an uncontrollable amount of the developer T in the neighborhood above the fluid communication path 4*d* is also discharged into the developer supplying apparatus 201 in the discharging stroke. The uncontrollable amount of the developer in the structure of the comparison example mainly includes the developer T influenced by the uncontrolled developer powder surface in the developer supply container 1 in the neighborhood above the fluid communication path 4*d*. When the developer powder surface is not controlled, the developer powder surface in the neighborhood above the fluid communication path 4*d* may be high or low, and therefore, the developer amount flowing into the fluid communication path 4*d* in the discharging stroke is uncontrollable and not constant. For these reasons, the uncontrollable amount of the developer T is discharged from the neighborhood of the fluid communication path 4*d* in the discharging stroke, in the comparison example.

In addition, with the comparison example, the upper portion of the fluid communication path 4*d* is in the open state in the discharging stroke, and therefore, the developer T always present above the discharge opening 4*a*, and the developer T continues to discharged with the air flow by the pressure difference between the inside and outside of the developer supply container 1, until the internal pressure in the developer supply container 1 becomes equivalent to the ambient pressure.

Therefore, in the comparison example, the uncontrollable amount of the developer in the neighborhood above the fluid communication path 4*d* continues to discharged during the discharging stroke, and it is very difficult to acquire the supply accuracy provided by this embodiment of the present invention.

On the contrary, with the structure of this embodiment described above, the developer T above the fluid communication path 4*d* is pushed away by the downstream side radial prevention wall 7*c* (with respect to the rotational direction of the regulating portion 7) to provide a constant developer powder surface by truncation. By the regulating portion 7 overlaying the fluid communication path 4*d*, the flow of the developer T into the fluid communication path 4*d* is limited, so that the developer powder surface in the fluid communication path 4*d* can be maintained constant. In the discharging stroke, when the developer T in the fluid communication path 4*d* is discharged as described above, the spaces inside and outside of the developer supply container 1 are brought into communication with each other, and thereafter, only the air is discharged, and therefore, the continuing discharging of the developer by the pressure difference between the inside and outside of the developer supply container 1 can be prevented.

Accordingly, with the structure of this embodiment including the regulating portion 7, a constant amount of the developer T stored in the fluid communication path 4*d* can always be discharged into the developer supplying apparatus 201 in the discharging stroke, and the developer T can be discharged with very stable supply accuracy.

FIG. 23 shows the state in which the developer in the fluid communication path 4*d* has been discharged. At this time, no developer T exists in the fluid communication path 4*d* except for those deposited on the wall surfaces. With further rotation of the feeding member 6, the state returns to that shown in FIG. 20, and the similar steps are repeated, Therefore, with the structure of this embodiment, the developer T can be always discharged with stabilized supply accuracy from the initial stage to the later stage of the discharging, and the provision of the regulating portion 7 is very effective to provide a high supply accuracy.

In this embodiment, the feeding member 6 is provided with two such regulating portions 7, but this is not inevitable to the present invention. The two regulating portions 7 are provided corresponding to the two discharging strokes in the 360° rotation of the cylindrical portion 2*k*. If, for example, three discharging strokes are provided in the 360° rotation of the cylindrical portion 2*k*, three regulating portions 7 may be provided.

In addition, with the structure of this embodiment, the regulating portion 7 is provided integrally with the feeding member 6 which is the movable portion, as described above, and therefore, the regulating portion 7 integrally rotates together with the cylindrical portion 2*k*. In this structure, the driving force for rotating the cylindrical portion 2*k* and the driving force for reciprocating the pump portion 3*a* are received by a single drive receiving portion (gear portion 2*d*). In addition, the driving force for rotating the regulating portion 7 is also received by a single drive receiving portion (gear portion 2*d*) together with the driving force for rotating the cylindrical portion 2*k*. That is, the structure of this embodiment requires to receive three driving forces for the rotation of the cylindrical portion 2*k*, for the reciprocation of the pump portion 3*a* and for the rotation of the regulating portion 7, and these three driving forces are received by one drive receiving portion (gear portion 2*d*).

Therefore, the structure of this embodiment can significantly simplify the structure of the drive inputting mechanism for the developer supply container 1, as compared with the case in which three drive receiving portions are provided in the developer supply container 1. In addition, because the driving forces are received by a single driving mechanism (driving gear 300) of the developer supplying apparatus 201, the driving mechanism for the developer supplying apparatus 201 is also significantly simplified.

In addition, the two drives for the reciprocation of the pump portion 3*a* causing the discharge of the developer T and the rotation of the regulating portion 7 are interrelated with the rotation of the cylindrical portion 2*k*, and therefore, the adjustment of the timings of the drives of the pump portion 3*a* and the regulating portion 7 a very easy.

Modified Example 1

The developer supply container 1 of the present invention is not limited to the developer supply container 1 of Embodiment 1 described above. Parts (a) and (b) of FIG. 25 show a modified example which is capable of providing the same performance.

Parts (a) and (b) of FIG. 25 is a prospective sectional view of the developer supply container 1. Part (a) of FIG. 25 illustrates a state in which a contact portion 6b and a contact portion 7i which will be described hereinafter are spaced from each other, and part (b) of FIG. 25 illustrates a state in which the contact portion 6b and the contact portion 7i are contacted with each other. In this modified example, the structures of the feeding member 6 and the regulating portion 7 are different from those of Embodiment 1, and the other structures are substantially similar to those of Embodiment 1. Therefore, in this modified example, the same reference numerals as in Embodiment 1 are assigned to the elements having the corresponding functions, and the detailed description thereof is omitted.

As shown in FIG. 25, in this modified example, the feeding member 6 and the regulating portion 7 are not integral as contrasted to Embodiment 1, but the feeding member 6 and the regulating portion 7 are separate members. The feeding member 6 is rotated integrally with the cylindrical portion 2k driven by the rotational force received from the developer supplying apparatus 201, similarly to Embodiment 1. As shown in FIG. 25, the regulating portion 7 is supported by a shaft holding portion 4e provided in the discharging portion 4c, so that a rotation center shaft portion 7h of the regulating portion 7 is rotatably supported.

As shown in FIG. 25, the feeding member 6 and the regulating portion 7 of this modified example are provided with the contact portion 6b and the contact portion 7i, respectively. The contact portion 6b and the contact portion 7i are provided at such positions that they are contactable when the feeding member 6 is rotated, and by the rotation of the feeding member 6, the contact portion 6b is contacted to the contact portion 7i, by which the regulating portion 7 is rotated interrelatedly. Thus, also in this modified example, similarly to the structure of Embodiment 1, with the integral rotation of the feeding member 6 and the cylindrical portion 2k, the regulating portion 7 is rotated interrelatedly.

Therefore, also in this modified example, the regulating portion 7 in the developer supplying step can be driven similarly to Embodiment 1 described above, by which the operation rest stroke, the suction stroke and the discharging stroke described in conjunction with FIGS. 20-23 can be performed similarly to Embodiment 1. In the modified example employing the regulating portion 7 is capable of always a constant amount of the developer T stored in the fluid communication path 4d, and the developer T can be discharged with a very stable supply accuracy. Furthermore, in this modified example, the regulating portion 7 is supported in the discharging portion 4c side, and therefore, the gap between an outer end portion remote from the rotational axis of the regulating portion 7 and an inner wall of the discharging portion 4c can be controlled with higher accuracy than in Embodiment 1, and therefore, a further stabilized supply accuracy can be provided.

In addition, this modified example also requires three driving forces for the rotation of the cylindrical portion 2k, the reciprocation of the pump portion 3a and the rotation of the regulating portion 7, and the three driving forces are received by a single drive receiving portion (gear portion 2d).

Therefore, also in this modified example, the structure of the drive inputting mechanism for the developer supply container 1 can be significantly simplified, as compared with the case in which three separate drive receiving portions are provided in the developer supply container 1. In addition, because the driving forces are received by a single driving mechanism (driving gear 300) of the developer supplying apparatus 201, the driving mechanism for the developer supplying apparatus 201 is also significantly simplified.

Embodiment 2

Referring to FIGS. 26, 27, 28, Embodiment 2 will be described. FIG. 26 is a partially explored perspective view of a part of a section of a developer supply container according to Embodiment 2 of the present invention. Part (a) of FIG. 27 is a perspective view of a feeding member 6 in Embodiment 2, and part (b) of FIG. 27 is a partially sectional perspective view. Parts (a) and (b) of FIG. 28 are sectional views as seen from a pump portion 3a side of FIG. 26, illustrating a state in the container during a supplying operation.

In this embodiment, as shown in FIGS. 26, 27, the configuration of the regulating portion 7 provided integrally with the feeding member 6 is different from that of Embodiment 1. The other structures are the same as in Embodiment 1. Therefore, the common description is omitted, and the characteristic parts of this embodiment will be described. The same reference numerals as in the foregoing embodiment are assigned to the elements having the same functions.

The point of this embodiment is different from Embodiment 1 is in the position of an accommodating portion opening 7e of the regulating portion 7 in the state in which the flow of the developer T into the fluid communication path 4d is limited (developer flow limited state). This will be described in detail.

In Embodiment 1, as shown in FIG. 22, the position of the accommodating portion opening 7e in the developer flow limited state is in the neighborhood of the rotational axis center of the thrust prevention wall 7a provided in the pump portion 3a side. On the contrary, in this embodiment, as shown in FIG. 28, the position of the accommodating portion opening 7e in the developer flow limited state is in the neighborhood of the most upper end of the discharging portion 4c with respect to the vertical direction.

In addition, as shown in FIG. 28, in the developer flow limited state, the fluid communication path opening 7f of the regulating portion 7 is in the neighborhood of the most lower end of the discharging portion 4c, similarly to Embodiment 1. The air flow path 7g inside the regulating portion 7 is a space connecting the accommodating portion opening 7e and the fluid communication path opening 7f, similarly to Embodiment 1. Therefore, in this embodiment, in the developer flow limited state, the air flow path 7g inside the regulating portion 7 is a space connecting the neighborhood of the most upper end of the discharging portion 4c and the most lower end. In addition, in this embodiment, as shown in FIG. 27, one opening is reversed in the phase by the rotation of the regulating portion 7, and therefore, it functions as both of the accommodating portion opening 7e and the fluid communication path opening 7f.

In the developer supplying step shown in FIG. 28, the same effects as those of Embodiment 1 are provided by the rotation of the regulating portion 7. Therefore, this embodiment employing the regulating portion 7 is capable of always discharging a constant amount of the developer T stored in the fluid communication path 4d in the discharging stroke as described in the foregoing, and therefore, the developer T can be discharged with very stable supply accuracy into the developer supplying apparatus 201.

In addition, in this embodiment, in the developer flow limited state, the position of the accommodating portion opening 7e is in the neighborhood of the most upper end of the discharging portion 4c with respect to the vertical direction, by which the developer T can be discharged with more assured stable supply accuracy than with Embodiment 1. The detailed description will be made.

When the accommodating portion opening 7e is in the neighborhood of the rotational axis center of the regulating portion 7 as in Embodiment 1 shown in FIG. 22, there is a possibility that the developer T flows into the regulating portion 7 from the accommodating portion opening 7e if the developer powder surface in the developer supply container 1 is in the neighborhood of the accommodating portion opening 7e. And, in the developer flow limited state, when the developer T flows from the accommodating portion opening 7e, the developer T may pass through the air flow path 7g and the fluid communication path opening 7f and may additionally flow into the fluid communication path 4d overlaid with the regulating portion 7. For this reason, although the structure employing the regulating portion 7 is intended to this charge only the developer T in the fluid communication path 4d as described in the foregoing, there is a possibility that an uncontrollable amount of the developer T having flown into the fluid communication path 4d through the accommodating portion opening 7e is also discharged together. As a result, although Embodiment 1 is capable of discharging the developer very stable supply accuracy, the discharge amount may vary due to the influence of the uncontrollable amount of the developer T from the developer powder surface flowing into the fluid communication path 4d.

However, in this embodiment, as shown in FIG. 28, in the developer flow limited state, the accommodating portion opening 7e is in the neighborhood of the most upper end of the discharging portion 4c, and therefore, the possibility that the developer powder surface is adjacent to the accommodating portion opening 7e is very small as compared with the case of Embodiments 1. For this reason, the possibility of the developer T flowing into the regulating portion 7 through the accommodating portion opening 7e can be significantly reduced, and this embodiment is advantageous over Embodiment 1 from the standpoint of preventing the flowing of the developer T into the regulating portion 7. Accordingly, the amount of the developer T addition are flowing into the fluid communication path 4d overlaid with the regulating portion 7 is little, and therefore, the amount of the developer T in the fluid communication path 4d is always stabilized. As a result, with the structure of this embodiment employing the regulating portion 7, only the developer T in the fluid communication path 4d Is discharged in the discharging stroke, and therefore, the developer T can be discharged with more assured stable supply accuracy, and is preferable to Embodiment 1.

INDUSTRIAL APPLICABILITY

According to the present invention, the developer can be discharged with high supply accuracy from the developer supply container, and therefore, a developer supply container having a more stabilized discharging property to the image forming apparatus can be provided.

The invention claimed is:

1. A developer supply container comprising:
a developer accommodating body configured to contain developer; and
a developer discharging body in fluid communication with the developer accommodating body, the developer discharging body including a discharging passageway through which the developer may be discharged to outside of the developer supply container, the discharging passageway including (i) an entrance port provided inside of the developer discharging body and configured to receive the developer, and (ii) a discharge port configured to discharge the developer to outside of the developer supply container, with the developer accommodating body being rotatable relative to the developer discharging body about a rotational axis; and
a rotatable member provided in the developer discharging body and rotatable about the rotational axis, the rotatable member including a plurality of extending portions extending radially with respect to the rotational axis, the radially extending portions each including a radially outside end portion, with each outside end portion having a dimension, as measured in the direction of the rotational axis, such that the outside end portion at least partly overlaps the entrance port, as viewed in a direction perpendicular to the rotational axis.

2. A developer supply container according to claim 1, wherein the rotatable member is integrally rotatable with the developer accommodating body.

3. A developer supply container according to claim 1, wherein the radially outside end portions pass through an upper space above the entrance port in association with rotation of the rotatable member.

4. A developer supply container according to claim 1, further comprising:
a fluid communication passageway in fluid communication with an inside of the developer accommodating body; and
a feeding member provided in the fluid communication passageway and configured to feed the developer from the developer accommodating body to the developer discharging body,
wherein the feeding member is integrally provided with the rotatable member.

* * * * *